(12) United States Patent
Fujimura

(10) Patent No.: US 9,136,933 B2
(45) Date of Patent: Sep. 15, 2015

(54) DEMULTIPLEXING APPARATUS, MULTIPLEXING APPARATUS, AND RELAY APPARATUS

(75) Inventor: Akinori Fujimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 126 days.

(21) Appl. No.: 13/818,578

(22) PCT Filed: Aug. 22, 2011

(86) PCT No.: PCT/JP2011/068848
§ 371 (c)(1),
(2), (4) Date: Feb. 22, 2013

(87) PCT Pub. No.: WO2012/026417
PCT Pub. Date: Mar. 1, 2012

(65) Prior Publication Data
US 2013/0155941 A1    Jun. 20, 2013

(30) Foreign Application Priority Data

Aug. 25, 2010  (JP) ................. 2010-188768

(51) Int. Cl.
*H04B 7/15* (2006.01)
*H04J 1/05* (2006.01)
*H04B 7/155* (2006.01)

(52) U.S. Cl.
CPC ... *H04B 7/15* (2013.01); *H04J 1/05* (2013.01); *H04B 7/155* (2013.01)

(58) Field of Classification Search
CPC ............. H04B 7/15; H04B 7/155; H04J 1/05; H04J 1/04; H04J 1/045
USPC .................. 370/315, 535, 536, 537
See application file for complete search history.

(56) References Cited

U.S. PATENT DOCUMENTS 6,014,366 A    1/2000  Ichiyoshi 6,714,529 B1    3/2004  Tanabe et al.
(Continued)

FOREIGN PATENT DOCUMENTS

| JP | 8 84049 | 3/1996 |
|---|---|---|
| JP | 2738385 | 4/1998 |

(Continued)

OTHER PUBLICATIONS

Yamashita, F., et al., "A Proposal of Onboard Bandwith-variable FFT Filter Banks and its Fundamental Characteristics," The Institute of Electronics, Information and Communication Engineers Transaction, vol. J85-B, No. 12, pp. 2290-2299, (Dec. 2002).

(Continued)

*Primary Examiner* — Min Jung
(74) *Attorney, Agent, or Firm* — Oblon, McClelland, Maier & Neustadt, L.L.P.

(57) ABSTRACT

A demultiplexing apparatus includes: a demultiplexed-signal selecting and distributing unit configured to apply frequency conversion processing and down-sampling processing to one or more reception signals and output reception signals to a designated output destination; frequency converting and reception low-pass filter units configured to apply frequency conversion processing and low-pass filter processing to reception signals and output reception signals while down-sampling reception signals; selector units configured to switch an input source of a signal output to the frequency converting and reception low-pass filter unit at a next stage; reception-channel filter units configured to subject signals from the frequency converting and reception low-pass filter units to waveform shaping with a desired frequency characteristic and output the signals; and a filter-bank control unit configured to generate, based on channel information estimated from one or more reception signals, a control signal controlling the demultiplexed-signal selecting and distributing unit and the selector units.

20 Claims, 16 Drawing Sheets

(56) References Cited

U.S. PATENT DOCUMENTS

| | | | |
|---|---|---|---|
| 7,936,742 B2 | 5/2011 | Kobayashi et al. | |
| 8,023,400 B2* | 9/2011 | Jung | 370/210 |
| 8,675,628 B2* | 3/2014 | Fujimura et al. | 370/343 |
| 8,731,123 B2* | 5/2014 | Fujimura | 375/350 |
| 8,743,914 B1* | 6/2014 | Jensen | 370/535 |
| 2006/0205352 A1* | 9/2006 | Bialek et al. | 455/63.3 |
| 2008/0205261 A1* | 8/2008 | Mohebbi | 370/210 |
| 2011/0222467 A1 | 9/2011 | Fujimura et al. | |
| 2012/0269238 A1 | 10/2012 | Fujimura | |

FOREIGN PATENT DOCUMENTS

| | | |
|---|---|---|
| JP | 2001 111639 | 4/2001 |
| WO | 2007 136010 | 11/2007 |
| WO | 2010 064485 | 6/2010 |
| WO | 2011 065287 | 6/2011 |

OTHER PUBLICATIONS

International Search Report Issued Nov. 22, 2011 in PCT/JP11/68848 Filed Aug. 22, 2011.

* cited by examiner (a) RECEPTION SIGNAL (b) DEMULTIPLEXING FILTER SEPARATION REGION (c) DEMULTIPLEXING FILTER OUTPUT SPECTRUM (d) SWITCH MATRIX OUTPUT (= MULTIPLEXING FILTER INPUT)

(e) TRANSMISSION SIGNAL

FIG.13

| STAGE | FREQUENCY CONVERTING AND RECEPTION LOW-PASS FILTER UNIT | EXTRACTION REGION |
|---|---|---|
| 1 | 101 | (5), (6), (7), (8) |
| 1 | 102 | (1), (2), (3), (4) |
| 2 | 103 | (7), (8) |
| 2 | 104 | (5), (6) |
| 2 | 105 | (3), (4) |
| 2 | 106 | (1), (2) |
| 3 | 107 | (8) |
| 3 | 108 | (7) |
| 3 | 109 | (6) |
| 3 | 110 | (5) |
| 3 | 111 | (4) |
| 3 | 112 | (3) |
| 3 | 113 | (2) |
| 3 | 114 | (1) |

FIG.14

| STAGE | TRANSMISSION LOW-PASS FILTER AND FREQUENCY CONVERTING UNIT | ADDER | MULTIPLEXING TARGET REGION |
|---|---|---|---|
|  |  | 337 | (1), (2), (3), (4), (5), (6), (7), (8) |
| 1 | 323 | 335 | (5), (6), (7), (8) |
|  | 324 | 336 | (1), (2), (3), (4) |
| 2 | 319 | 331 | (7), (8) |
|  | 320 | 332 | (5), (6) |
|  | 321 | 333 | (3), (4) |
|  | 322 | 334 | (1), (2) |
| 3 | 311 |  | (8) |
|  | 312 |  | (7) |
|  | 313 |  | (6) |
|  | 314 |  | (5) |
|  | 315 |  | (4) |
|  | 316 |  | (3) |
|  | 317 |  | (2) |
|  | 318 |  | (1) |

DEMULTIPLEXING APPARATUS, MULTIPLEXING APPARATUS, AND RELAY APPARATUS

FIELD

The present invention relates to a demultiplexing apparatus, a multiplexing apparatus and a relay apparatus that simultaneously demultiplexes, multiplexes and relays signals arriving from a plurality of areas.

BACKGROUND

In a digital multiplexing apparatus and a digital demultiplexing apparatus adapted to multiple rates, it has been possible to perform digital demultiplexing and digital multiplexing of signals in various band widths by combining a sub-filter and Fourier transform (or fast Fourier transform: FFT) means. Technologies concerning the digital multiplexing apparatus and the digital demultiplexing apparatus adapted to multiple rates are disclosed in Patent Literature 1 and a Non-Patent Literature 1 below.

CITATION LIST

Patent Literature

Patent Literature 1: Japanese Patent No. 2738385

Non Patent Literature

Non Patent Literature 1: Fumihiro Yamashita, Hiroshi Kazama, and Yoshinori Nakasuka, "A Proposal of Onboard Bandwidth-variable FFT Filter Banks and its Fundamental Characteristics", The Institute of Electronics, Information and Communication Engineers Transaction, B, Vol. J85-B, No. 12, pp. 2290 to 2299, December 2002

SUMMARY

Technical Problem

However, according to the related art, a Fourier transform (or fast Fourier transform) circuit applies processing to all system bands. Therefore, even if a processing target band of demultiplexing/multiplexing is a part of all the system bands, because of an operation principle, it is impossible to cause only a part of the circuit to operate. Therefore, there is a problem in that a circuit size cannot be reduced even if the processing target region of demultiplexing/multiplexing is a part of all the system bands.

In particular, when signals from a plurality of areas are subjected to demultiplexing, switching, and multiplexing in this order, if the related art is applied to a radio system that relays the signals to the areas, even if a processing target region of demultiplexing/multiplexing is a part of all system bands, it is necessary to secure a circuit equivalent to the number of areas. Therefore, there is a problem in that a circuit size increases in proportion to the number of areas.

The present invention has been devised in view of the above and it is an object of the present invention to obtain demultiplexing/multiplexing apparatuses in which a circuit size can be reduced when signals from a plurality of areas are relayed.

Solution to Problem

In order to solve above-mentioned problems and achieve the object, there is provided a demultiplexing apparatus according to the present invention that includes a demultiplexed-signal selecting and distributing unit configured to output one or more input signals to one or more output destinations designated by a predetermined control signal; a reception low-pass filter group including frequency converting and reception low-pass filter units configured to apply frequency conversion processing and down-sampling processing to an output signal of the demultiplexed-signal selecting and distributing unit, the frequency converting and reception low-pass filter units being arranged in a tree shape, and at least a part of the frequency converting and reception low-pass filter units dividing the output signal into two and inputting the divided output signals to tow frequency converting and reception low-pass filter units at a next stage; and a selector unit configured to switch, based on the control signal, an input source of a signal input to the frequency conversion and reception low-pass filter unit to any one of the demultiplexed-signal selecting and distributing unit and a frequency converting and reception low-pass filter unit at a preceding stage of the frequency converting and reception low-pass filter unit.

Advantageous Effects of Invention

According to the present invention, there is an effect that it is possible to reduce a circuit size when signals from a plurality of areas are relayed.

BRIEF DESCRIPTION OF DRAWINGS

FIG. 13 is a diagram of extraction target regions of frequency converting and reception low-pass filter units.

FIG. 14 is a diagram of multiplexing target regions of transmission low-pass filter and frequency converting unit and adders.

DESCRIPTION OF EMBODIMENTS

A demultiplexing/multiplexing apparatuses according to an embodiment of the present invention is explained in detail below based on the drawings. The present invention is not limited by the embodiment.

Embodiment

In this embodiment, a demultiplexing apparatus, a multiplexing apparatus, and a relay apparatus including the demultiplexing apparatus and the multiplexing apparatus in which a circuit size can be reduced are explained.

Figure 1:
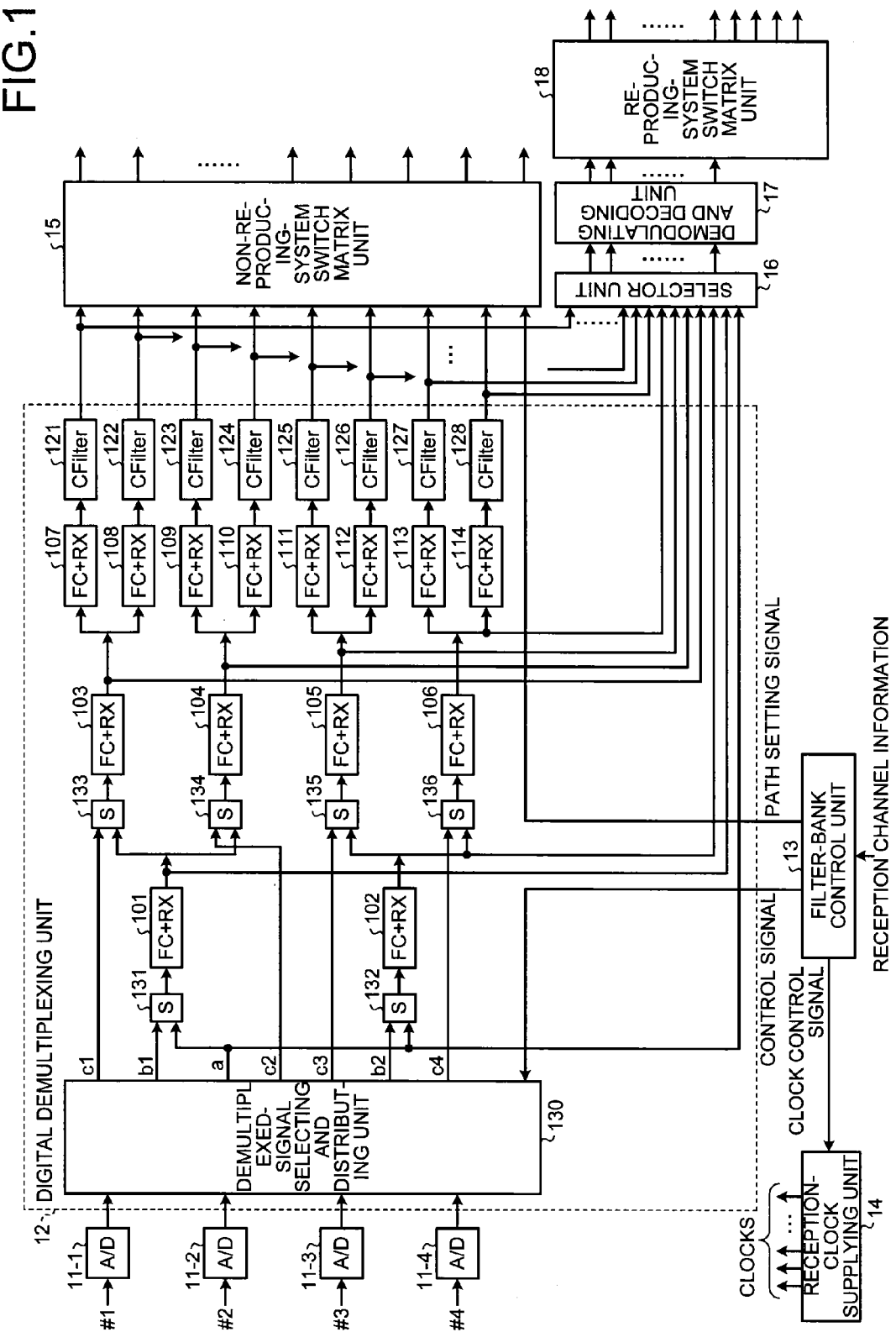
FIG. 1 is a diagram of a configuration example of a digital demultiplexing apparatus.

FIG. 1 is a diagram of a configuration example of a digital demultiplexing apparatus according to this embodiment. The digital demultiplexing apparatus can receive signals (#1, #2, #3, and #4) from maximum four areas and simultaneously demultiplex the signals. The digital demultiplexing apparatus has a three-stage configuration. When the number of stages is represented as stage (=1, 2, 3, etc.), a maximum number of waves to be demultiplexed is represented as "$2^{stage}$". In the configuration shown in FIG. 1, because stage=3, demultiplexing of maximum eight (=$2^3$) waves is realized. In explanation in this embodiment, signals are received from four areas. However, the present invention is also applicable when the number of areas is other than four. A case of stage=3 is explained. However, the present invention is also applicable when stage=4 or more.

In FIG. 1, the digital demultiplexing apparatus includes an A/D conversion unit (A/D) 11-1 that applies analog/digital conversion to a reception pre-demultiplexing signal from an area #1, an A/D conversion unit (A/D) 11-2 that applies analog/digital conversion to a reception pre-demultiplexing signal from an area #2, an A/D conversion unit (A/D) 11-3 that applies analog/digital conversion to a reception pre-demultiplexing signal from an area #3, an A/D conversion unit (A/D) 11-4 that applies analog/digital conversion to a reception pre-demultiplexing signal from an area #4, a digital demultiplexing unit 12 that demultiplexes a signal after A/D conversion, a filter-bank control unit 13 that controls operations of components based on reception channel information, a reception-clock supplying unit 14 that supplies clocks to the components based on a clock control signal, a non-reproducing-system switch matrix unit 15 that selects a part of or all of input signals, changes arrangement of frequency directions, and outputs the signals, a selector unit 16 that selects a signal for reproduction and relay out of signals in a demultiplexing process, a demodulating and decoding unit 17 that performs demodulation and decoding processing of the signal for reproduction and relay, and a reproducing-system switch matrix unit 18 that outputs demodulated and decoded data via a set path.

The digital demultiplexing unit 12 includes a demultiplexed-signal selecting and distributing unit 130 that selects the signals (#1, #2, #3, and #4) from the areas after carrying out frequency conversion and thinning-out processing according to necessity and distributes the signals to a circuit at a post stage, frequency converting and reception low-pass filter units (FC+RX) 101 to 114 that, after applying frequency conversion and low-pass filter processing to the signals, reduce a sampling rate for the signals to a half of an input data rate and then output the signals, reception-channel filter units (CFilter) 121 to 128 that apply filter processing to the output signals from the frequency converting and reception low-pass filter units 107 to 114, and selector units (S) 131 to 136 that perform switching of a path for demultiplexing all system bands and an input path from halfway in the path. Although not shown in FIG. 1, it is assumed that a control signal from the filter-bank control unit 13 is input to the selector units 131 to 136 as well.

When a signal is demultiplexed into $2^N$ waves (N=the number of stages: N is a natural number equal to or larger than 1), in a tournament (tree) format shown in FIG. 1, as the number of frequency conversion and reception low-pass filter units, $2^M$ frequency conversion and reception low-pass filter units are necessary at an Mth stage ($1 \leq M \leq N$) and $2^{N+1}-2$ frequency conversion and reception low-pass filter units are necessary in the entire digital demultiplexing unit 12. $2^N$ reception-channel filter units are necessary in the entire digital demultiplexing unit 12. As an example, the selector units 131 to 136 are arranged before the frequency converting and reception low-pass filter units 101 to 106. However, the arrangement of the selector units 131 to 136 is not limited to this. The selector units 131 to 136 can be arranged before the frequency converting and reception low-pass filter units 107 to 114 as well.

Figure 2:
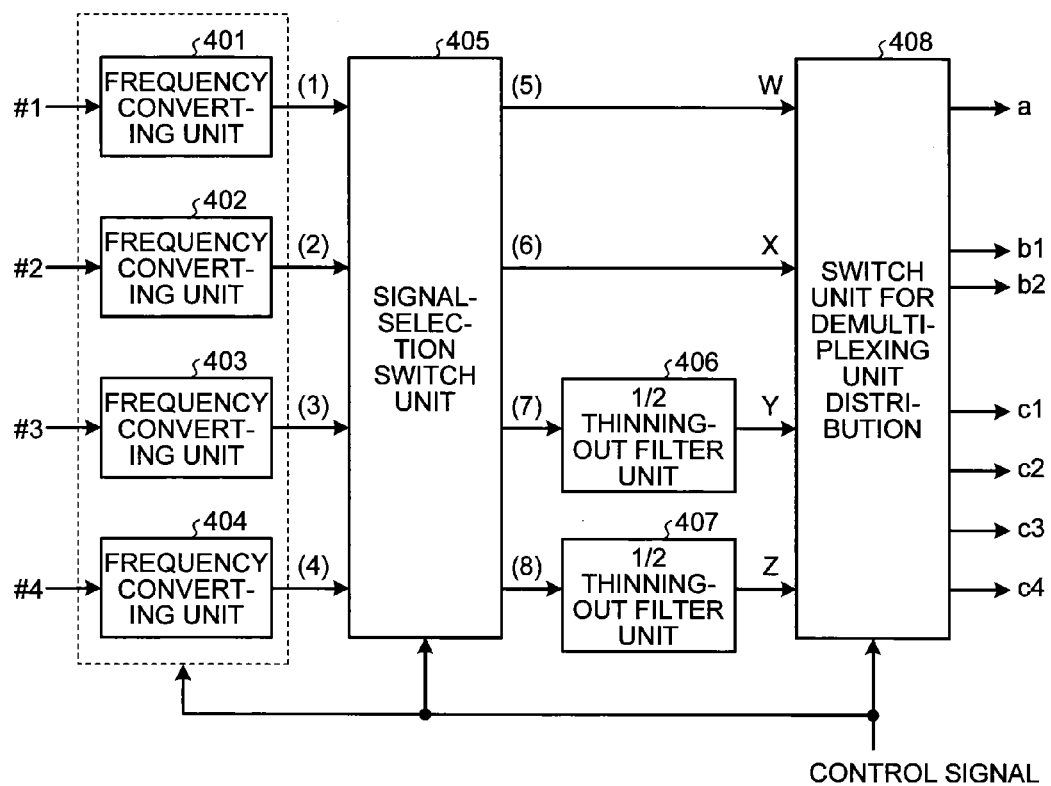
FIG. 2 is a diagram of a configuration example of a demultiplexed-signal selecting and distributing unit.

FIG. 2 is a diagram of a configuration example of the demultiplexed-signal selecting and distributing unit 130. The demultiplexed-signal selecting and distributing unit 130 includes a frequency converting unit 401 that subjects a signal from the area #1 to frequency conversion, a frequency converting unit 402 that subjects a signal from the area #2 to frequency conversion, a frequency converting unit 403 that subjects a signal from the area #3 to frequency conversion, a frequency converting unit 404 that subjects a signal from the area #4 to frequency conversion, a signal-selection switch unit 405 that allocates, based on a control signal input from the filter-bank control unit 13, the area signals (#1, #2, #3, and #4) after the frequency conversion to predetermined output ports (four places in total) according to necessity, ½ thinning-out filter units 406 and 407 that thin out an input sampling rate to a half and output the signals, and a switch unit 408 for distribution to demultiplexing unit that selects, based on a control signal input from the filter-bank control unit 13, the outputs of the ½ thinning-out filter units 406 and 407 and the output of the signal-selection switch unit 405 and outputs one or more signals from any one of output ports a, b1, b2, c1, c2, c3, and c4.

The filter-bank control unit 13 generates, based on reception channel information, a clock control signal for controlling supply of clocks to the components by the reception-clock supplying unit 14, a path setting signal for setting a path to the non-reproducing-system switch matrix unit 15, and a control signal for performing selection and switching of paths to the demultiplexed-signal selecting and distributing unit 130 and the selector units 131 to 136.

In this embodiment, it is possible to output signals input from a plurality of areas to a plurality of areas by combining the digital demultiplexing apparatus with a digital multiplexing apparatus explained below. However, it is determined in advance a signal input from which area is output to which area. The reception channel information includes information indicating a signal input from which area is output to which area. Therefore, it is possible to specify what kind of path a signal input from a certain area passes (the demultiplexed-signal selecting and distributing unit 130 outputs a signal to which frequency converting and reception low-pass filter unit) in the digital demultiplexing unit 12 including the configuration of the tournament (tree) format. Therefore, the filter-bank control unit 13 can control flows of signals using a control signal.

For example, the filter-bank control unit 13 can determine, based on the reception channel information, a frequency converting and reception low-pass filter unit to which the demultiplexed-signal selecting and distributing unit 130 outputs a signal and control paths of the demultiplexed-signal selecting and distributing unit 130 and the selector units 131 to 136 such that the signal passes the frequency conversion and reception low-pass filter unit.

Figure 3:
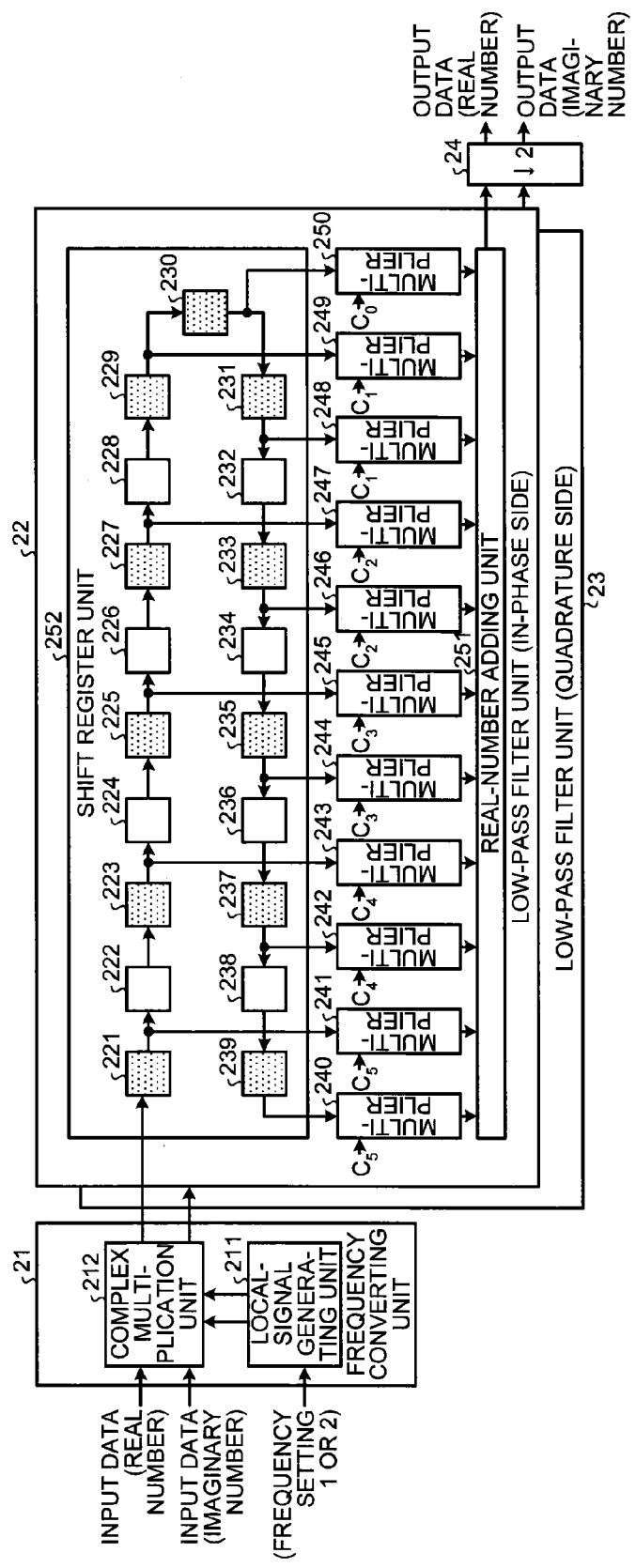
FIG. 3 is a diagram of a configuration example of a frequency converting and reception low-pass filter unit.

FIG. 3 is a diagram of a configuration example of the frequency converting and reception low-pass filter units 101 to 114. In the configuration, the number of taps of a filter is set to nineteen. The frequency converting and reception low-pass filter units 101 to 114 include a frequency converting unit 21, a low-pass filter unit (in-phase side) 22, a low-pass filter unit (quadrature side) 23, and a down-sampler unit 24 that thins out output data of the low-pass filter units 22 to 23 to a half (thins out the data at a ratio of once in two times and discards the remainder). The reception low-pass filter units can include a half-band filter that reduces a circuit size (the number of multipliers). The frequency converting unit 21 includes a local-signal generating unit 211 and a complex multiplication unit 212. The frequency converting unit 21 realizes arbitrary (free) frequency offset according to external setting. The low-pass filter unit (in-phase side) 22 includes a shift register unit 252 including register units 221 to 239, multipliers 240 to 250, and a real-number adding unit 251. The configuration of the low-pass filter unit (quadrature side) 23 is the same as the configuration of the low-pass filter unit (in-phase side) 22.

Figure 4:
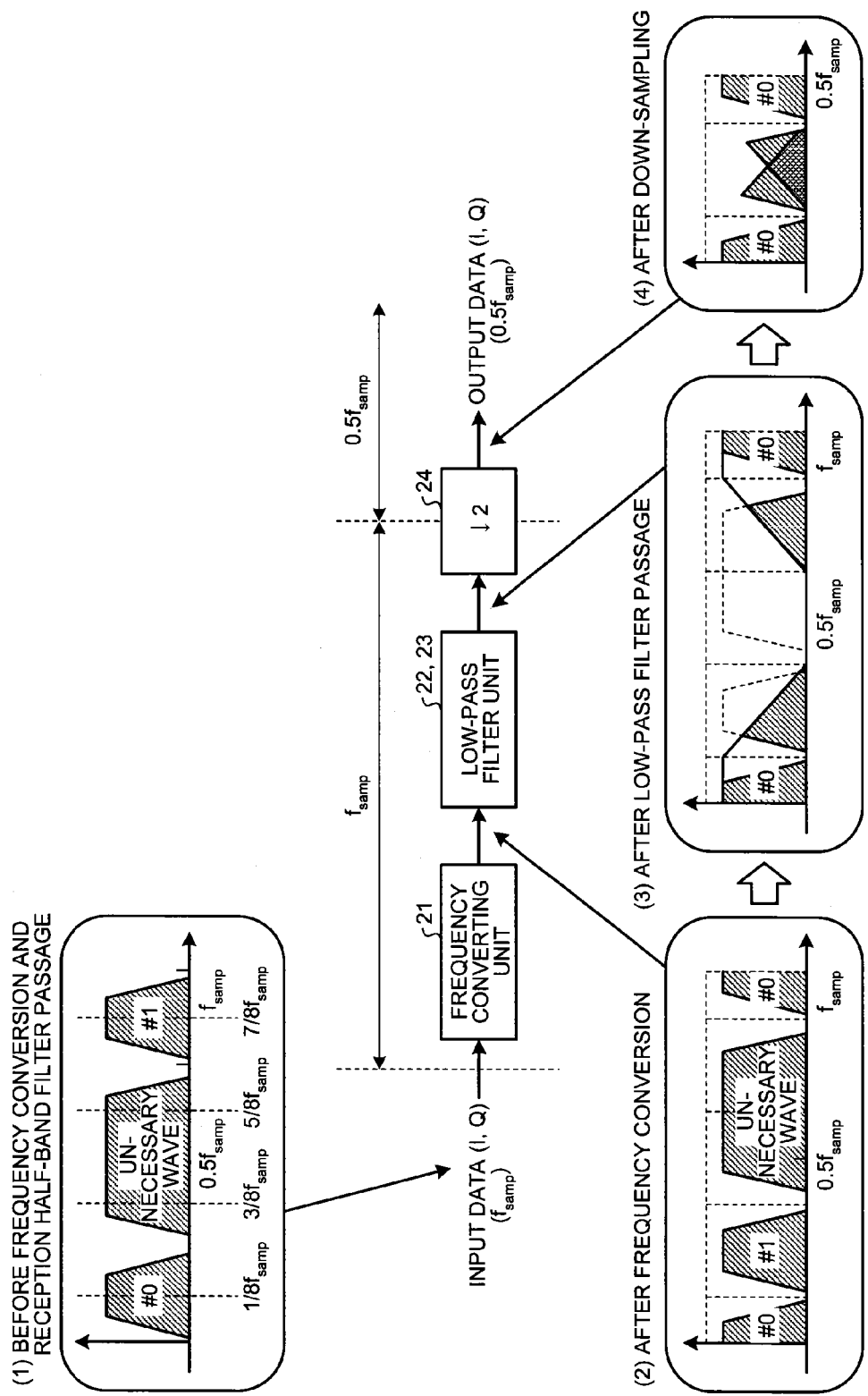
FIG. 4 is a diagram for explaining processing of the frequency converting and reception low-pass filter unit.

Processing by the frequency converting and reception low-pass filter units 101 to 114 is explained. FIG. 4 is a diagram for explaining the processing by the frequency converting and reception low-pass filter units 101 to 114. The frequency converting and reception low-pass filter units 101 to 114 extract, in the low-pass filters, a part of an input signal band (bandwidth $f_{samp}$) sampled at a sampling rate $f_{samp}$ while down-converting the part of the input signal band to a center frequency zero.

For example, as shown in FIG. 4(1), when three signal spectra (#0, an unnecessary wave, and #1) are present in an input signal band and the signal #0 or the signal #1 is extracted, the frequency converting unit 21 offsets a center frequency of the signal to any sampling frequency to +0.125 $f_{samp}$ or −0.125 $f_{samp}$, where $f_{samp}$ is a sampling frequency.

The frequency converting unit 21 shifts the frequency by −0.125 $f_{samp}$ to convert the center frequency of the signal #0 to zero (#0 in FIG. 4(2)). Similarly, the frequency converting unit 21 shifts the frequency by +0.125 $f_{samp}$ to convert the signal #1 to the center frequency 0. The frequency converting unit 21 performs any one of the two kinds of frequency conversion.

The low-pass filter units 22 and 23 allow the signal frequency-converted to the center frequency 0 (DC) by the processing to pass and remove a part of signal components in a region of at least 0.25 $f_{samp}$ to 0.75 $f_{samp}$ (FIG. 4(3): when the signal #0 is converted into DC).

The down-sampler unit 24 thins out data after passing through the low-pass filter units 22 and 23 to a half. Therefore, frequency components in a region of 0.5 $f_{samp}$ to 1.0 $f_{samp}$ of the signal before the thinning-out overlap frequency components in a region of 0.0 $f_{samp}$ to 0.5 $f_{samp}$. However, because the signal components in the region of 0.25 $f_{samp}$ to 0.75 $f_{samp}$ are removed by the low-pass filter units 22 and 23 beforehand, it does not occur that an alias component overlaps an extraction target signal band and deteriorates an S/N (FIG. 4(4)). In FIGS. 4(2) to 4(4), a process for extracting the signal #0 after frequency-converting the signal #0 into the DC is shown. Because the frequency-converting unit 21 frequency-converts the signal #1 into the center frequency 0, similarly, it is possible to extract the signal #1 after converting the signal #1 into the DC.

Figure 5:
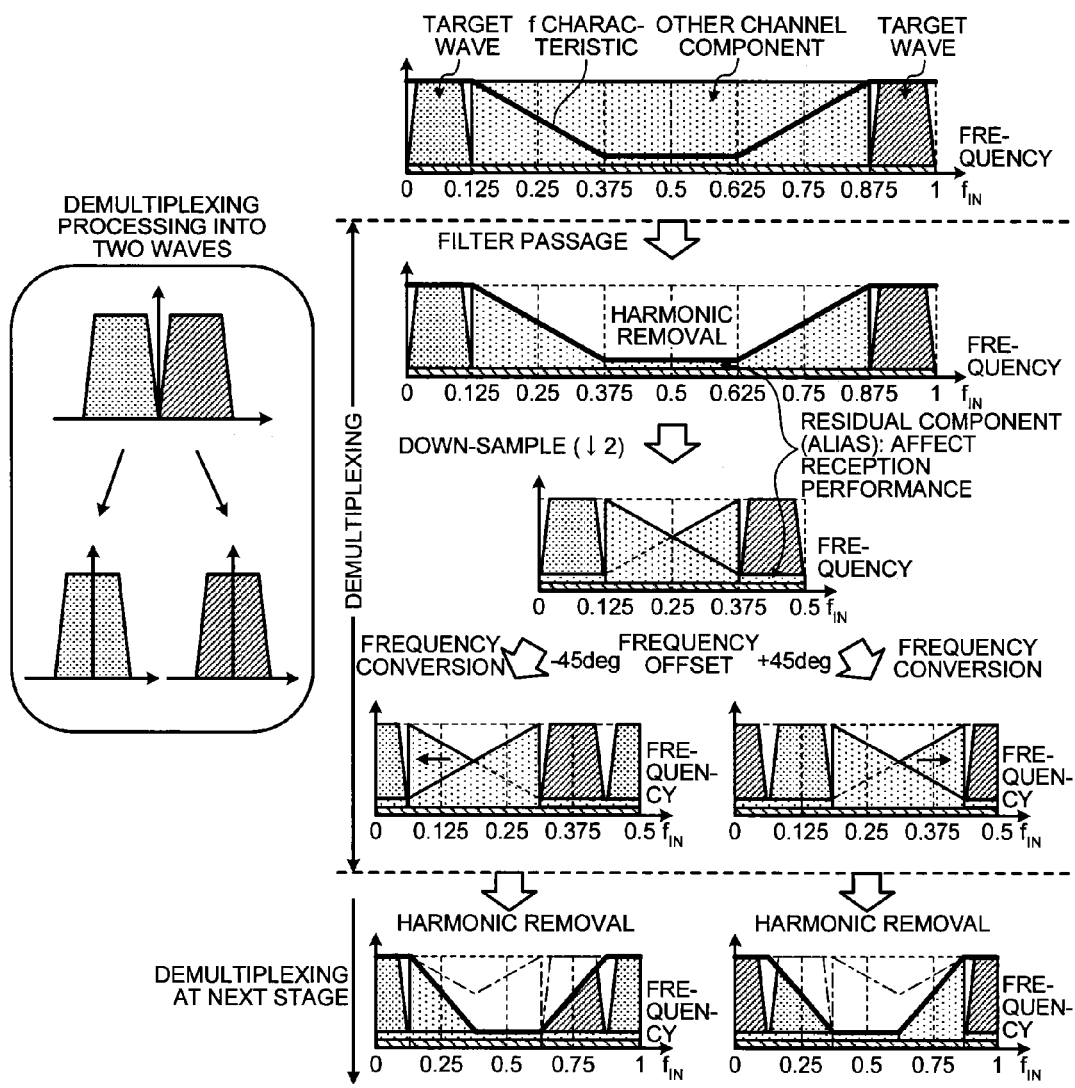
FIG. 5 is a diagram for explaining two-wave demultiplexing processing on a frequency axis.

FIG. 5 is a diagram for explaining two-wave demultiplexing processing on a frequency axis. A flow of . . . →low-pass filter→down-sample→frequency conversion→ . . . is shown. In the demultiplexing processing in this embodiment, such processing of "frequency conversion→low-pass filter→down-sample→frequency conversion→low-pass filter→down-sample . . . " is repeated until a sampling rate after the down-sample reaches a double of minimum channel width (Fc) in which minimum signal bandwidth (bandwidth Bw) in the system fits. In a process of the processing, signals (2 Bw, 3 Bw, 4 Bw, etc.) having wide bandwidths may be decomposed into a plurality of signals. One time (one cycle) of the demultiplexing processing itself is equivalent to the existing method. Therefore, detailed explanation of the demultiplexing processing is omitted.

Subsequently, the reception-channel filter units 121 to 128 extract only a target signal out of signals output from the frequency converting and reception low-pass filter units 107 to 114 at the last stage while shaping a waveform according to a frequency characteristic shown in FIG. 6.

An amplitude to frequency characteristic (A(f)) required of this channel filter has a characteristic that a sum of the amplitude to frequency characteristic (A(f)) and a characteristic obtained by turning down the frequency characteristic with respect to the center frequency Fc (A(Fc−f)) is fixed. For example, the amplitude to frequency characteristic (A(f)) required of this channel filter satisfies a formula below.

$$A(f)=1.0(f \leq 0.5Bw) \quad (1)$$

$$A(f)=0.0(f>Fc-0.5Bw) \quad (2)$$

$$A(f)+A(Fc-f)=1.0(0.5Bw<f \leq Fc-0.5Bw) \quad (3)$$

Figure 6:
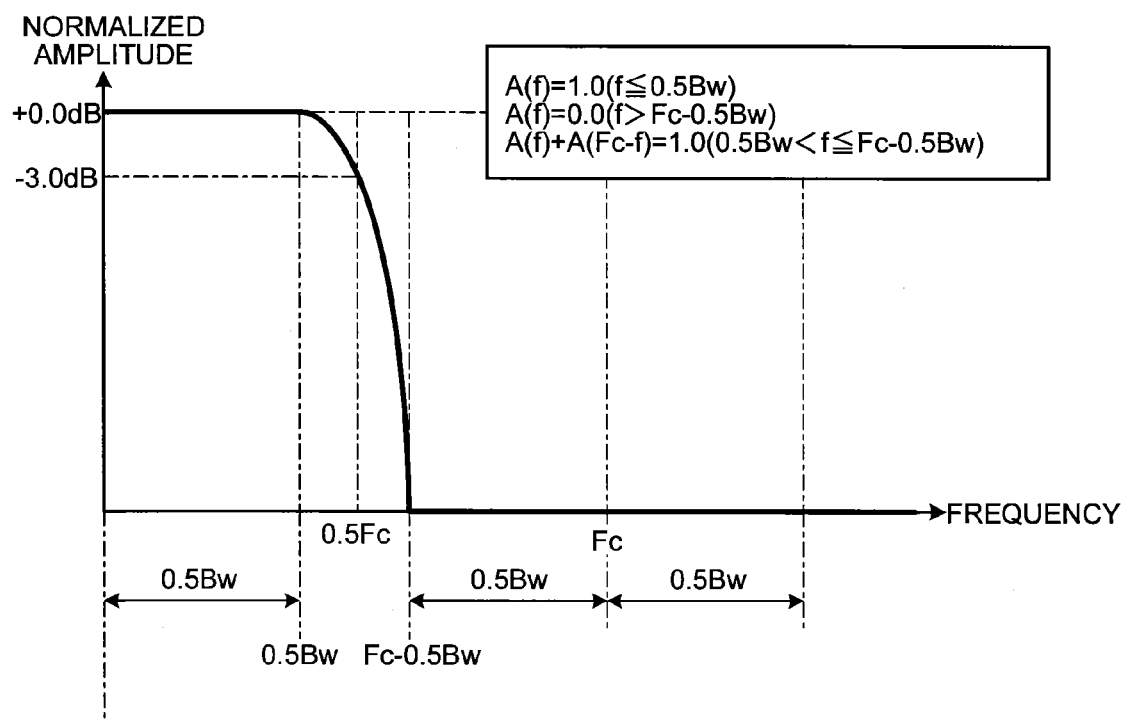
FIG. 6 is a diagram of a frequency characteristic of a reception-channel filter unit.

As shown in FIG. 6, A(f)=0.5(−3.0 dB) at f=0.5 Fc.

As a filter that satisfies such a characteristic, for example, there is a full Nyquist filter. According to a relation that a sampling rate is a double of Fc, this channel filter can be formed by a half-band filter having a small circuit size.

A target wave is extracted while being subjected to waveform shaping using this channel filter that satisfies the characteristic. Consequently, when the wideband signals (2 Bw, 3 Bw, 4 Bw, etc.) decomposed into a plurality of signals in the process are combined again, it is possible to restore the original wideband signals without distortion of waveforms and spectra.

Figure 7:
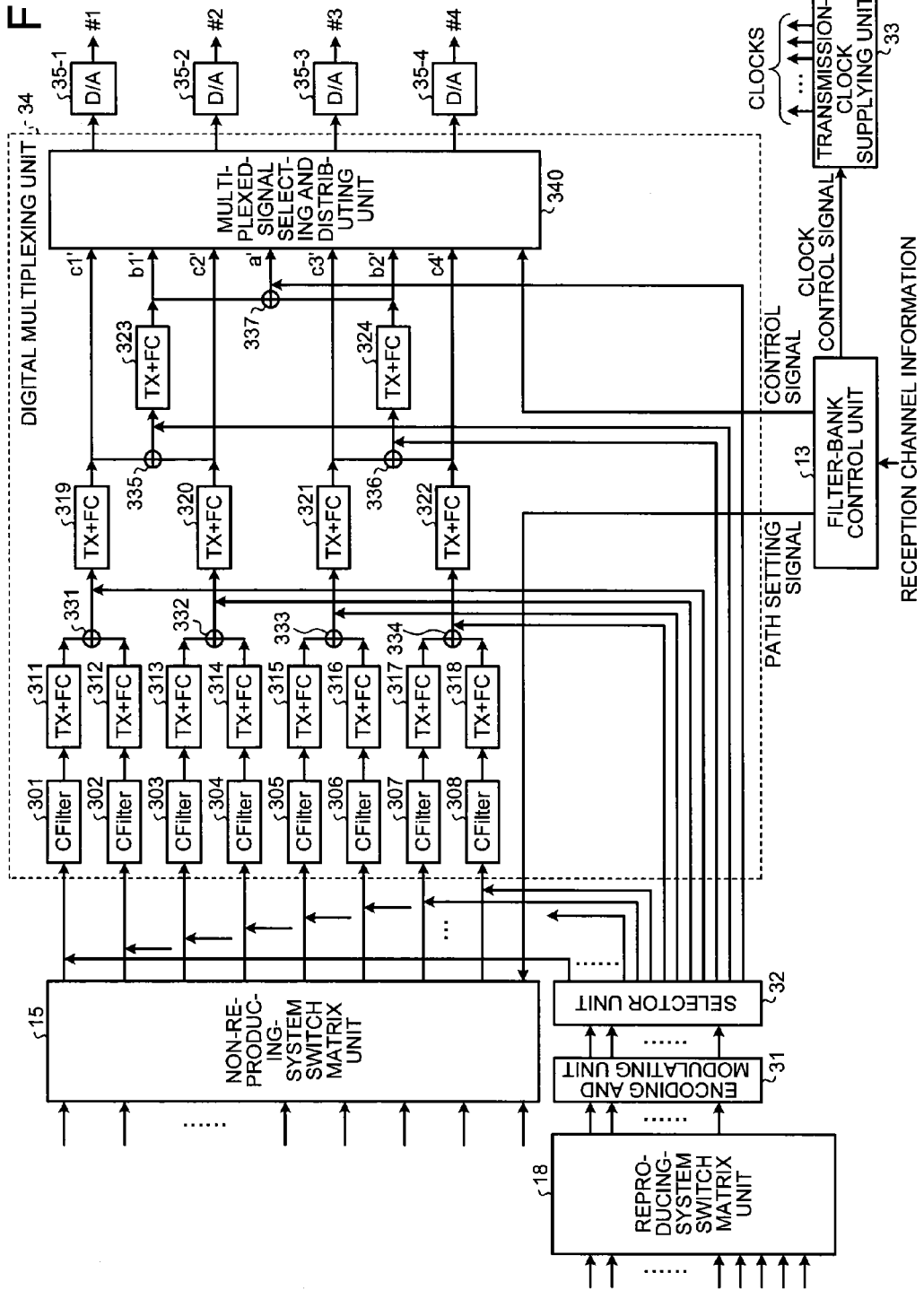
FIG. 7 is a diagram of a configuration example of a digital multiplexing apparatus.

Subsequently, a digital multiplexing apparatus is explained. The digital multiplexing apparatus simultaneously transmits signals demultiplexed by the digital demultiplexing apparatus to a plurality of areas while multiplexing the signals. FIG. 7 is a diagram of a configuration example of the digital multiplexing apparatus according to the embodiment. The digital multiplexing apparatus according to the embodiment simultaneously transmits signals (#1, #2, #3, and #4) to maximum four areas while multiplexing the signals demultiplexed by the digital demultiplexing apparatus. Like the digital demultiplexing apparatus, the digital multiplexing apparatus has a three-stage (stage=3) configuration and realizes multiplexing of maximum eight (=$2^3$) waves. In explanation in this embodiment, signals are transmitted to four areas. However, the present invention is also applicable when the number of areas is other than four. Similarly, the present invention is also applicable when stage=4 or more.

In FIG. 7, the digital multiplexing apparatus includes a reproducing-system switch matrix unit 18, an encoding and modulating unit 31 that performs encoding and modulation processing for a signal, a selector unit 32 that allocates the encoded and modulated signal to inputs of transmission low-pass filter and frequency converting units of respective stages, the non-reproducing-system switch matrix unit 15, the filter-bank control unit 13, a transmission-clock supplying unit 33 that performs supply of clocks to components based on a clock control signal, a digital multiplexing unit 34 that simultaneously transmits signals, which are received from the non-reproducing-system switch matrix unit 15 or the reproducing-system switch matrix unit 18, to maximum four areas (#1, #2, #3, and #4) while multiplexing the signals, a D/A conversion unit (D/A) 35-1 that subjects data to the area #1 to digital/analog conversion and outputs the data, a D/A conversion unit (D/A) 35-2 that subjects data to the area #2 to digital/analog conversion and outputs the data, a D/A conversion unit (D/A) 35-3 that subjects data to the area #3 to digital/analog conversion and outputs the data, and a D/A conversion unit (D/A) 35-4 that subjects data to the area #4 to digital/analog conversion and outputs the data.

The digital multiplexing unit 34 includes transmission-channel filter units (CFilter) 301 to 308 that apply filter processing to the output signals from the non-reproducing-system switch matrix unit 15 or the signals allocated by the selector unit 32, transmission low-pass filter and frequency converting units (TX+FC) 311 to 324 that, after interpolating a sampling rate to a double of an input data rate, subject the signals to frequency conversion and output the signals, adders 331 to 337 that adds up output signals from two transmission low-pass filter and frequency converting units in adjacent bands among the transmission low-pass filter and frequency converting units 311 to 324, and a multiplexed-signal selecting and distributing unit 340 that receives outputs of the transmission low-pass filter and frequency converting units 319 to 324 and the adder 337 and, after carrying out interpolation processing according to necessity, selects the outputs and subjects the outputs to frequency conversion, and distributes the outputs to the D/A conversion units 35-1 to 35-4 at the post stage.

When input signals of $2^N$ waves (N=the number of stages: N is a natural number equal to or larger than 1) are multiplexed, in a tournament (tree) format shown in FIG. 7, as the number of transmission low-pass filter and frequency converting units, $2^{(N-M+1)}$ transmission low-pass filter and frequency converting units are necessary at an Mth stage ($1 \leq M \leq N$) and $2^{N+1} - 2$ transmission low-pass filter and frequency converting units are necessary in the entire digital multiplexing unit 34. $2^N - 1$ adders are necessary in the entire digital multiplexing unit 34.

Figure 8:
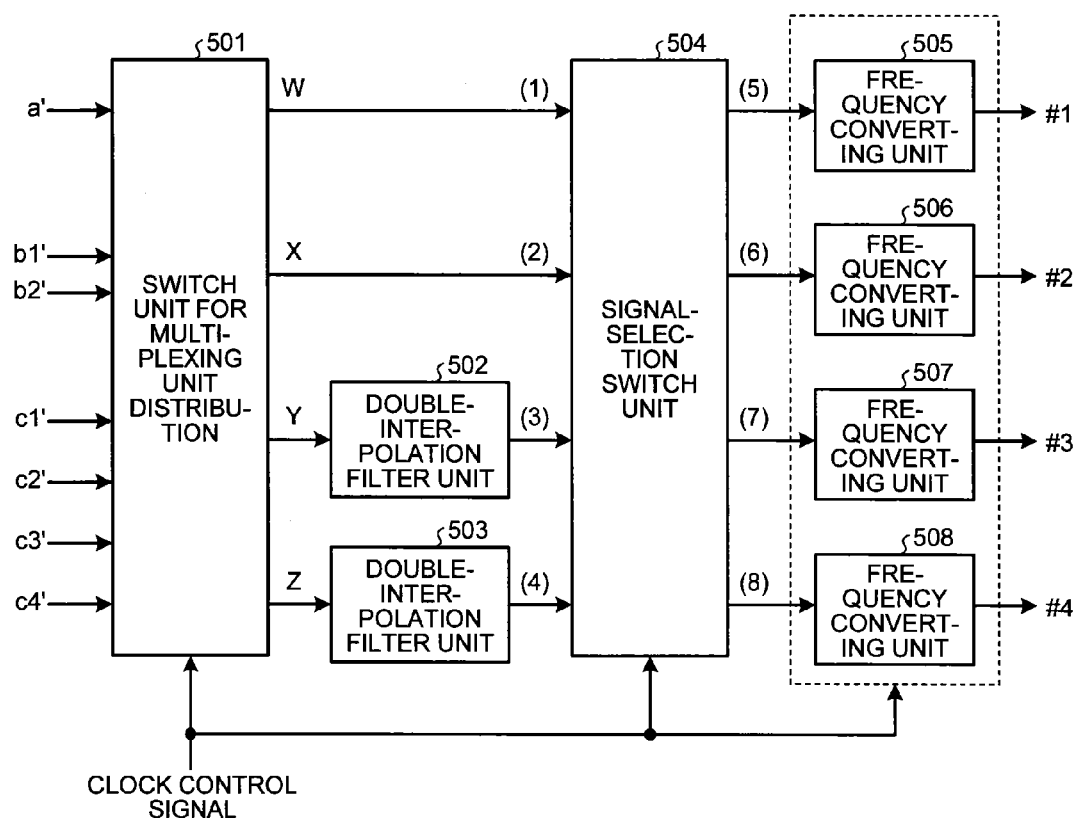
FIG. 8 is a diagram of a configuration example of a multiplexed-signal selecting and distributing unit.

FIG. 8 is a diagram of a configuration example of the multiplexed-signal selecting and distributing unit 340. The multiplexed-signal selecting and distributing unit 340 includes a switch unit 501 for distribution to multiplexing unit that selects, based on a control signal input from the filter-bank control unit 13, maximum four outputs from the outputs of the transmission low-pass filter and frequency converting units 319 to 324 and the adder 337 and allocates the outputs to output ports (four places in total), double-interpolation filter units 502 and 503 that interpolates an input sampling rate to a double and outputs the outputs, a signal-selection switch unit 504 that selects, based on a control signal input from the filter-bank control unit 13, the outputs of the double-interpolation filter units 502 and 503 and the outputs of the switch unit 501 for distribution to multiplexing unit and outputs one or more signals from output ports for respective areas (four places in total), a frequency converting unit 505 that subjects a signal to the area #1 to frequency conversion and outputs the signal, a frequency converting unit 506 that subjects a signal to the area #2 to frequency conversion and outputs the signal, a frequency converting unit 507 that subjects a signal to the area #3 to frequency conversion and outputs the signal, and the frequency converting unit 508 that subjects a signal to the area #4 to frequency conversion and outputs the signal. As an example, the numbers of the areas are the same numbers as the areas on the demultiplexing side. However, the numbers are not limited to these numbers. For example, the signals can be transmitted to other areas (#5, #6, #7, #8, etc.).

As in the digital demultiplexing apparatus, the filter-bank control unit 13 generates, based on reception channel information, a clock control signal for controlling supply of clocks to the components by the transmission-clock supplying unit 33, a path setting signal for setting a path to the non-reproducing-system switch matrix unit 15, and a control signal for performing selection and switching of a path to the multiplexed-signal selecting and distributing unit 340.

In this embodiment, it is possible to output signals input from a plurality of areas to a plurality of areas by combining the digital demultiplexing apparatus with the digital multiplexing apparatus explained above. However, it is determined in advance a signal input from which area is output to which area. The reception channel information includes information indicating a signal input from which area is output to which area. Therefore, it is possible to specify what kind of path a signal input from a certain area passes (the multiplexed-signal selecting and distributing unit 340 receives an input of a signal from which transmission low-pass filter and frequency converting unit) in the digital multiplexing unit 34 having a tournament (tree) configuration. Therefore, the filter-bank control unit 13 can control flows of signals using a control signal.

For example, the filter-bank control unit 13 can determine, based on the reception channel information, a transmission low-pass filter and frequency converting unit from which the multiplexed-signal selecting and distributing unit 340 receives a signal and control paths of the transmission low-pass filter and frequency converting units 319 to 324 and the multiplexed-signal selecting and distributing unit 340 such that the signal from the transmission low-pass filter and frequency converting unit is input to the multiplexed-signal selecting and distributing unit 340.

Figure 9:
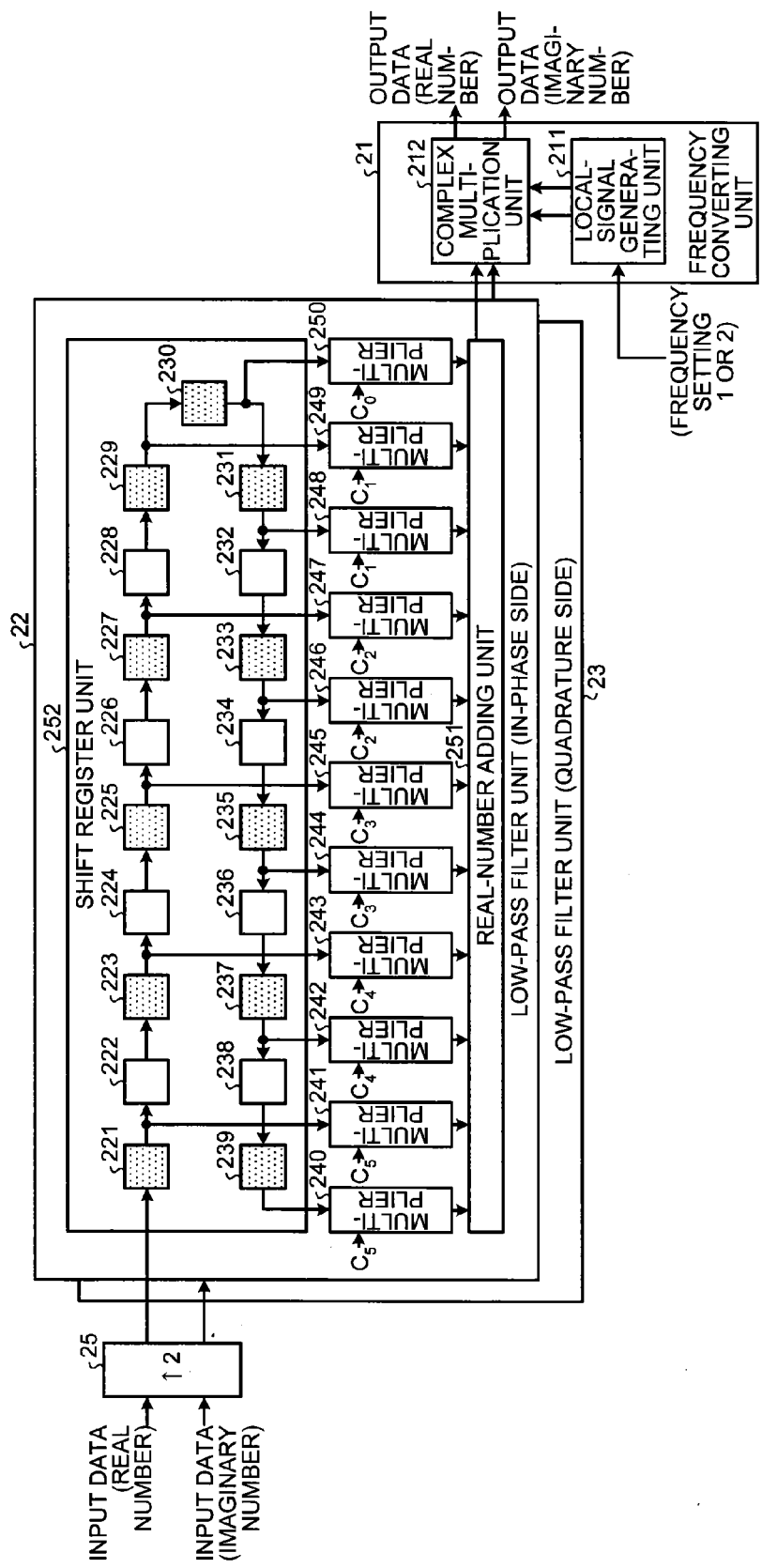
FIG. 9 is a diagram of a configuration example of a transmission low-pass filter and frequency converting unit.

FIG. 9 is a diagram of a configuration example of the transmission low-pass filter and frequency converting units 311 to 324. In the configuration, the number of taps of a filter is set to nineteen. The transmission low-pass filter and frequency converting units 311 to 324 include an up-sampler unit 25 that up-samples input data (a real number and an imaginary number) to a double (inserts one zero between respective input data), the low-pass filter unit (in-phase side) 22, the low-pass filter unit (quadrature side) 23, and the frequency converting unit 21. The configurations of the low-pass filter unit (in-phase side) 22, the low-pass filter unit (quadrature side) 23, and the frequency converting unit 21 are respectively the same as the configurations of the low-pass filter unit (in-phase side) 22, the low-pass filter unit (quadrature side) 23, and the frequency converting unit 21 in FIG. 3. As on the reception side, the transmission low-pass filter unit can consist of a half-band filter.

Figure 10:
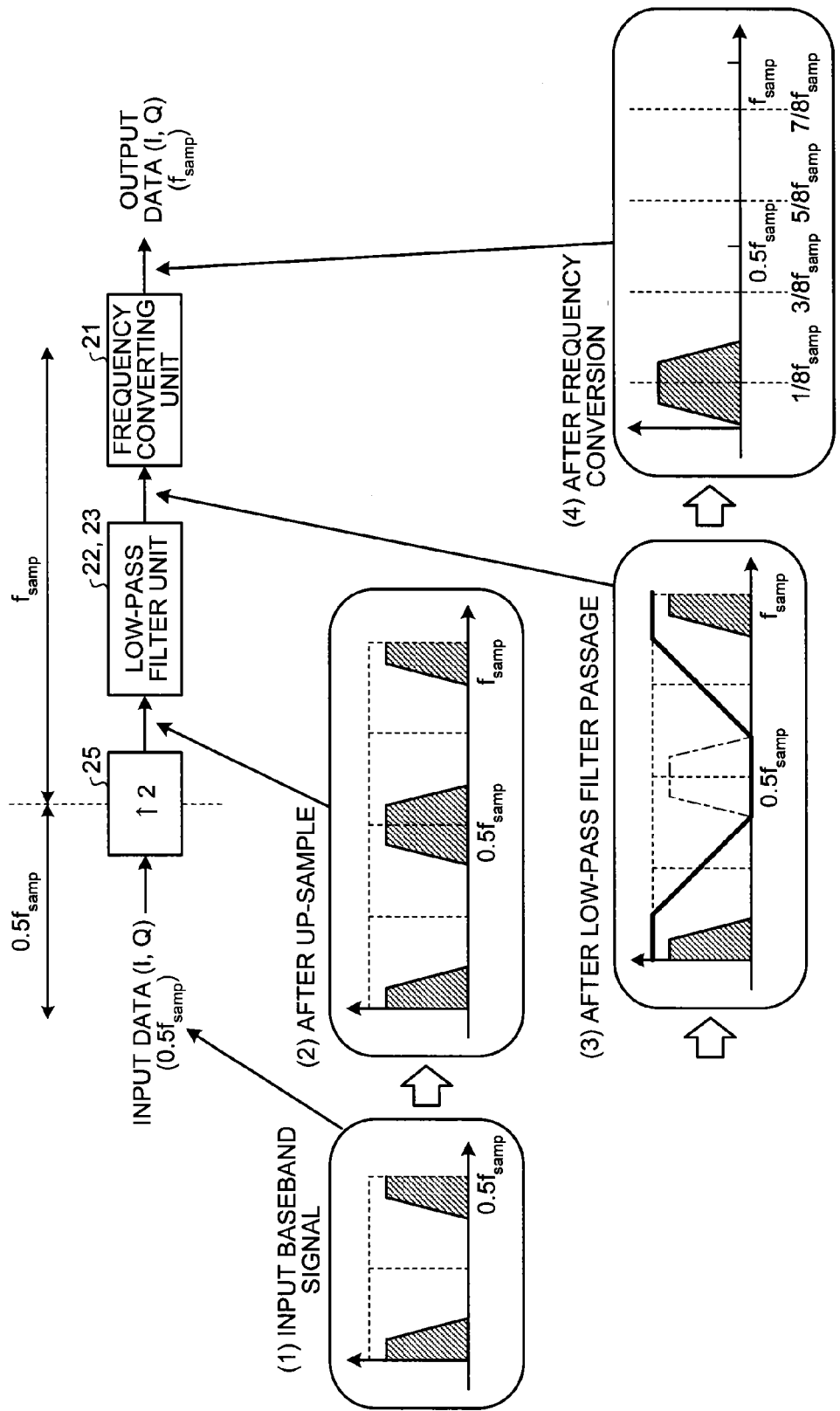
FIG. 10 is a diagram for explaining processing of the transmission low-pass filter and frequency converting unit.

Processing by the transmission low-pass filter and frequency converting units 311 to 324 is explained. FIG. 10 is a diagram for explaining the processing by the transmission low-pass filter and frequency converting units 311 to 324. The transmission low-pass filter and frequency converting units 311 to 324 offset a center frequency of an input signal to +0.125 $f_{samp}$ or −0.125 while interpolating a sampling rate (=0.5 $f_{samp}$) of the input signal to a double (=1.0 $f_{samp}$).

For example, an input baseband signal (FIG. 10(1)) is up-sampled to twice a rate of input by the up-sampler unit 25

(FIG. 10(2)) and, after an image component is removed by the low-pass filter units 22 and 23 (FIG. 10(3)), offsets to a frequency of +0.125 $f_{samp}$ by the frequency converting unit 21 (FIG. 10(4)). Similarly, after passing the up-sampler unit 25 and the low-pass filter units 22 and 23, the input baseband signal can be offset to a frequency of −0.125 $f_{samp}$ by the frequency converting unit 21.

Figure 11:
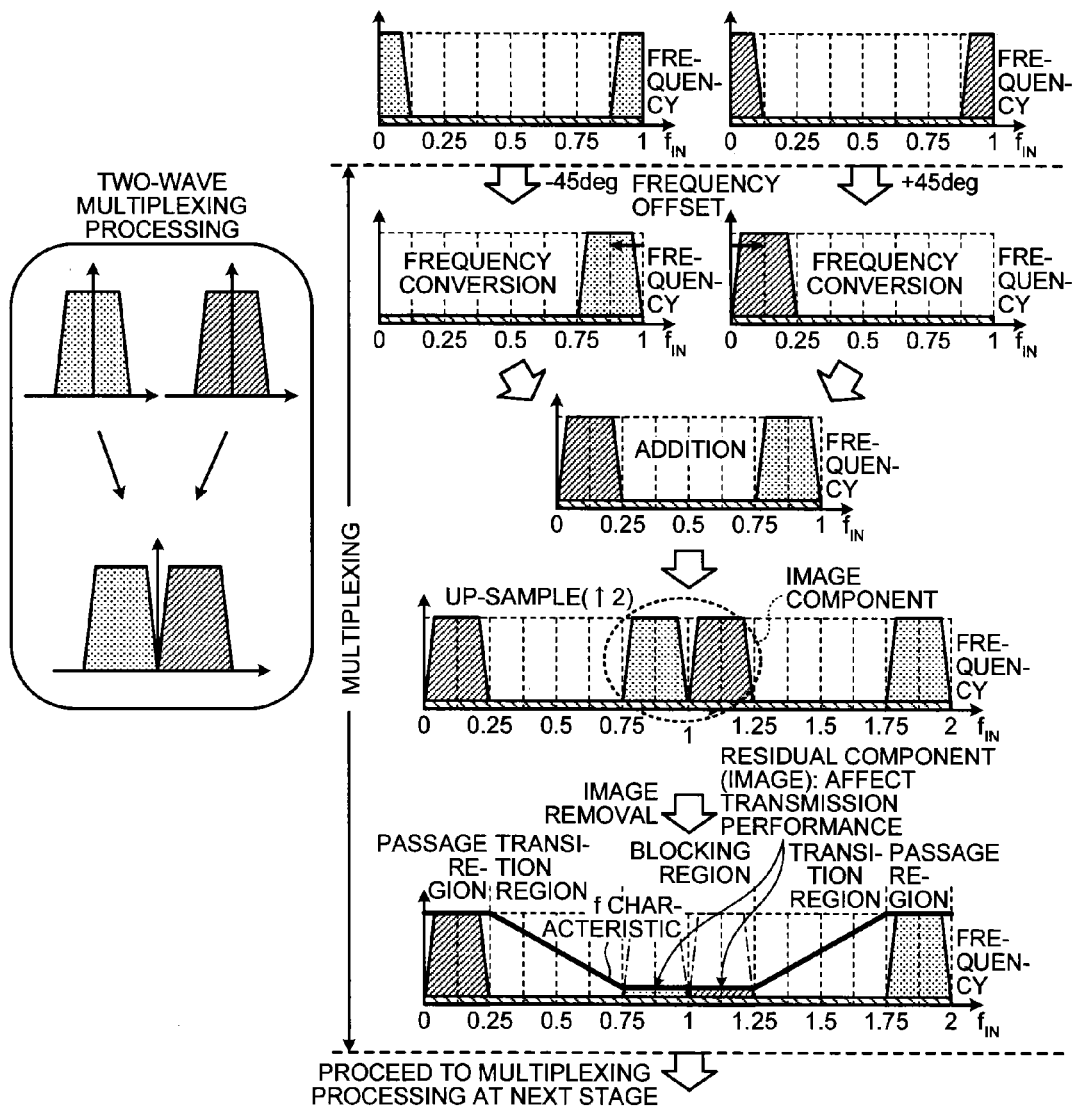
FIG. 11 is a diagram for explaining two-wave multiplexing processing on a frequency axis.

FIG. 11 is a diagram for explaining two-wave multiplexing processing on a frequency axis. A flow of . . . →frequency conversion→addition→up-sample→low-pass filter→ . . . is shown. In the multiplexing processing in this embodiment, after such processing of "up-sample→low-pass filter→frequency conversion", addition processing for other signals is added, and processing of "up-sample→low-pass filter→frequency conversion→addition→up-sample→low-pass filter→frequency conversion→addition . . . " is repeated until a sampling rate after the up-sample reaches a sampling rate of the D/A conversion unit 35. When two signals are added up, one signal is offset to the frequency of +0.125 $f_{samp}$, and the other signal is offset to the frequency of −0.125 $f_{samp}$. Therefore, the two signals do not overlap on the frequency axis. One time (one cycle) of the multiplexing processing itself is equivalent to the existing method. Therefore, detailed explanation of the multiplexing processing is omitted.

Subsequently, demultiplexing processing and multiplexing processing performed when a relay apparatus including the digital demultiplexing apparatus and the digital multiplexing apparatus performs relay processing are specifically explained. First, as a basic operation, a series of operations for relaying signals from one area to one area is explained. Then, an operation for relaying signals from a plurality of areas to a plurality of areas is explained.

Figure 12:
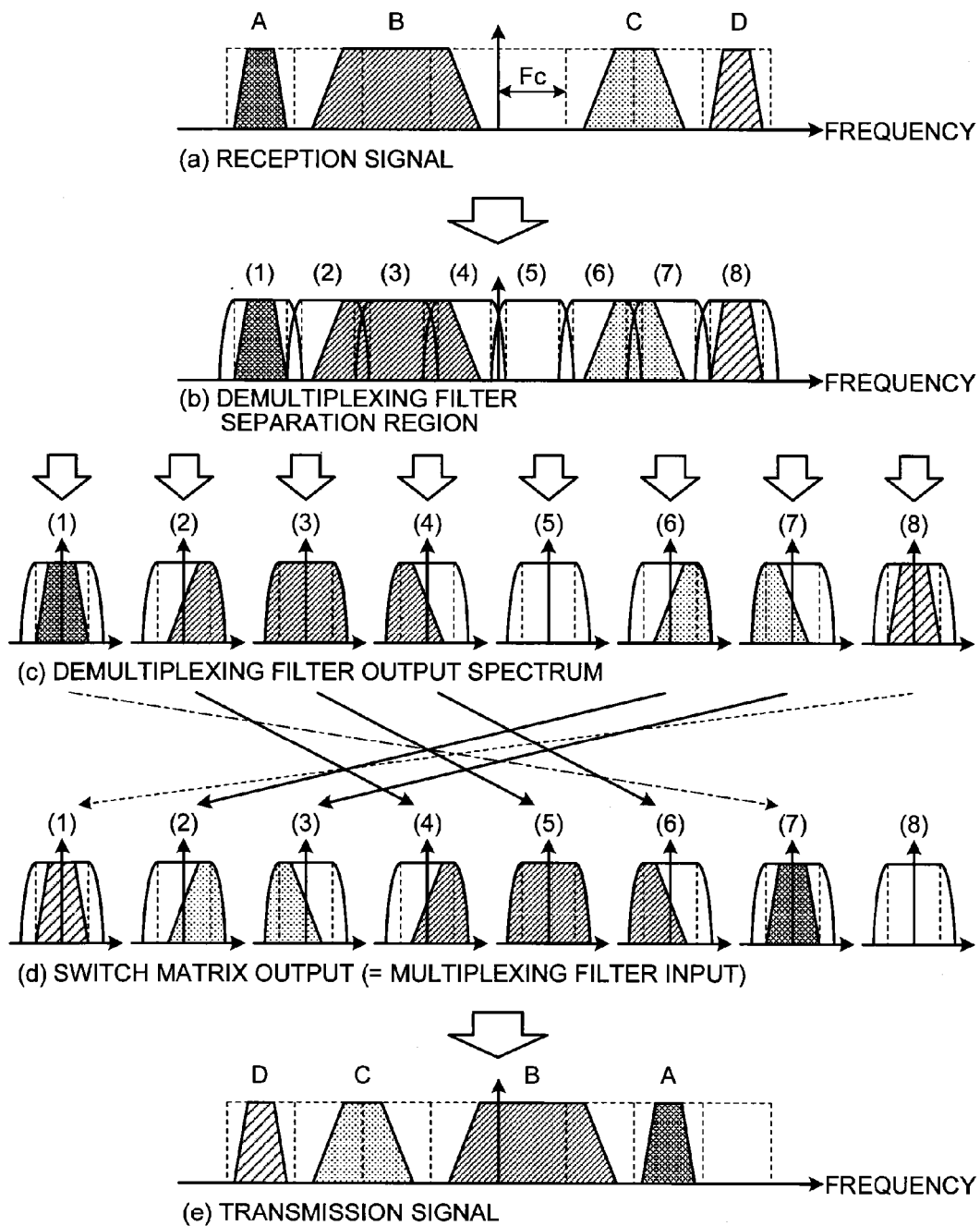
FIG. 12 is a diagram for explaining multiplexing/demultiplexing processing.

FIG. 12 is a diagram for explaining demultiplexing/multiplexing processing. As a basic operation, a series of operations for relaying signals from one area (the area #1) to another area (the area #3) while rearranging frequency arrangement is explained. In FIG. 12(a), a signal spectrum from the area #1 is shown. As shown in FIG. 12(a), signals A to D in different bands are present in signals from the area #1. The bands of the signals A and D have minimum signal bandwidth (Bw) and fit in minimum channel width (Fc). The band of the signal C is 2 Bw and the band of the signal B is 3 Bw. An unused region equivalent to the minimum channel width (Fc) is present between the signal B and the signal C. A system bandwidth including the unused region is 8 Fc in total. In the following explanation, it is assumed that total signal bandwidth from one area (the area #1) is 7 Fc that occupies most of the system bandwidth 8 Fc and signals from the other areas (#2 to #4) are not present.

First, the A/D conversion unit 11-1 samples the signal from the area #1 (FIG. 12(a)) at a sampling rate 16 Fc. Because signals are not input to the other A/D conversion units 11-2, 11-3, and 11-4, a sampling is not essential. For saving of consumption power, a sampling clock for A/D can be stopped according to a clock control signal from the filter-bank control unit 13. Actually, radio signals received by antennas are input to the A/D conversion units via an analog down-converter that converts a radio frequency into a baseband.

Subsequently, in the demultiplexed-signal selecting and distributing unit 130, when a signal from one area is relayed to one area, the frequency converting unit 401 outputs the signal from the A/D conversion unit 11-1 to the signal-selection switch unit 405 at the post stage without specifically performing conversion. The frequency converting unit 401 can carry out frequency conversion such as correction of a center frequency according to necessity.

The signal-selection switch unit 405 outputs, from an input terminal (1) to an output terminal (5) or (6), the signal received from the area #1.

The switch unit 408 for distribution to demultiplexing unit outputs, from the output port a, the signal received from the signal-selection switch unit 405.

Such a series of changeover of the switches is controlled by a control signal input from the filter-bank control unit 13. The filter-bank control unit 13 generates the control signal based on reception channel information estimated from the signal received from the area #1. The demultiplexed-signal selecting and distributing unit 130 can output, from the port a, the signal from the area #1 based on the control signal from the filter-bank control unit 13.

The signal from the area #1 output from the port a is input to the frequency converting and reception low-pass filter unit 101 through the selector unit 131 and input to the frequency converting and reception low-pass filter unit 102 through the selector unit 132. In FIG. 1, connection of signal lines is omitted. However, the control signal is input to the selector units 131 and 132 from the filter-bank control unit 13 as well. The selector units 131 and 132 also switch, based on the control signal, signals to be output.

Subsequently, the frequency converting and reception low-pass filter unit 101 extracts "the unused region, the signal C, and the signal D" and the frequency converting and reception low-pass filter unit 102 extracts "the signal A and the signal B" according to the operation shown in FIG. 4.

Similarly, the following frequency converting and reception low-pass filter units 103 to 114 perform stepwise signal separation based on two-waves demultiplexing. When separation regions of the demultiplexing filters are (1) to (8) (eight regions in total) shown in FIG. 12(b), target regions to be extracted by the frequency converting and reception low-pass filter units are indicated by FIG. 13. FIG. 13 is a diagram of extraction target regions of the frequency converting and reception low-pass filter units. FIG. 13 includes a stage, a frequency conversion and reception low-pass filter unit, and an extraction region. Extraction regions covered by the frequency converting and reception low-pass filter units for stages are shown.

As it is evident from FIG. 13, demultiplexing processing is applied in a tournament (tree) format for dividing an extraction region into two according to an increase in the number of stages. Actually, a part of signal components on the left and right of the extraction regions shown in FIG. 13 are also extracted. Therefore, the reception-channel filter units 121 to 128 extract signals of the frequency converting and reception low-pass filter units 107 to 114 at the stage 3 only in desired regions while shaping waveforms according to the amplitude to frequency characteristic (A(f)). A signal spectrum after the extraction by the reception-channel filter units 121 to 128 is shown in FIG. 12(c). As it is evident from FIG. 12(c), the signal B is separated into three ((2), (3), and (4)) and the signal C is separated into two ((6) an (7)).

According to a characteristic that, in every passage of a stage, a signal is divided into two and a sampling rate is also reduced to a half, it is possible to cause the frequency converting and reception low-pass filter units to operate in a time division manner in a stage unit. In this case, the frequency converting and reception low-pass filter units can be configured in the number of stages (in this embodiment, three).

The multiplexing processing in the relay processing is explained. The non-reproducing-system switch matrix unit 15 receives signals after the extraction by the reception-channel filter units 121 to 128, selects a part or all of the signals, and outputs the signals while changing the arrangement of frequency directions. In an example shown in FIG. 12(d), the non-reproducing-system switch matrix unit 15 selects signals in a region (1) corresponding to the signal A, regions (2), (3), and (4) corresponding to the signal B, regions (6) and (7) corresponding to the signal C, and a region (8) corresponding to the signal D and outputs the signals while rearranging the signals in such a way as (1)→(7), (2)→(4), (3)→(5), (4)→(6), (6)→(2), (7)→(3), and (8)→(1). A signal is not input to the remaining output region (8) other than the above. The filter-bank control unit 13 controls the operation of the non-reproducing-system switch matrix unit 15.

The filter-bank control unit 13 outputs clock control signals to the reception-clock supplying unit 14 and the transmission-clock supplying unit 33, outputs a path setting signal to the non-reproducing-system switch matrix unit 15, and outputs control signals to the demultiplexed-signal selecting and distributing unit 130, the multiplexed-signal selecting and distributing unit 340, and the like based on reception channel information estimated from a reception signal (a signal received from the area #1) acquired from a ground station through another line.

The transmission-channel filter units 301 to 308 shown in FIG. 7 are necessary when the reception-channel filter units 121 to 128 are not mounted in the digital demultiplexing unit 12. The transmission-channel filter units 301 to 308 perform waveform shaping and extraction of signals according to same frequency characteristics as the frequency characteristics of the reception-channel filter units 121 to 128. In other words, in a process for relaying a signal, the positions of the channel filters can be present either in the digital demultiplexing unit 12 or in the digital multiplexing unit 34.

As a measure for reducing a circuit size, both of the reception-channel filter units 121 to 128 of the digital demultiplexing unit 12 and the transmission-channel filter units 301 to 308 of the digital multiplexing unit 34 can be used to set a product of the frequency characteristics of the filter units to A(f) (e.g., the characteristic of Formulas (1) to (3)). In this case, the number of taps 2m (stages) required for realizing a target attenuation characteristic using two channel filters is smaller than the number of taps M (stages) required for realizing the target attenuation characteristics using one channel filter (M>2m). Therefore, a reduction effect for circuit size is obtained.

Subsequently, the multiplexing processing is stepwisely performed by the transmission low-pass filter and frequency converting units 311 to 324 and the adders 331 to 337 according to the operation shown in FIG. 10.

When signal regions in the multiplexing processing are (1) to (8) (eight regions in total) shown in FIG. 12(d), target regions to be multiplexed by the transmission low-pass filter and frequency converting units 311 to 324 and the adders 331 to 337 are shown in FIG. 14. FIG. 14 is a diagram of multiplexing target regions of the transmission low-pass filter and frequency converting units 311 and 324 and the adders 331 to 337. FIG. 14 includes a stage, a transmission low-pass filter and frequency converting unit, an adder, and a target multiplexing region. Target multiplexing regions covered by the transmission low-pass filter and frequency converting units and the adders at stages are shown. In the multiplexing processing, the stages are a stage 1, a stage 2, and a stage 3 in order from a side close to the D/A conversion units 35-1 to 35-4 (the downstream side).

As it is evident from FIG. 14, multiplexing processing is applied in a tournament (tree) format for expanding a multiplexing region to a double according to a decrease in the number of stages.

In FIG. 12(e), an output signal spectrum of the adder 337 is shown. For example, a component (1) of the signal D and one component (2) of the signal C are combined by the adder 334 after respectively passing the transmission low-pass filter and frequency converting unit 318 and the transmission low-pass filter and frequency converting unit 317 and input to the transmission low-pass filter and frequency converting unit 322. On the other hand, the other component (3) of the signal C is added up with an output of the transmission low-pass filter and frequency converting unit 322 in the adder 336 after passing the transmission low-pass filter and frequency converting unit 316, the adder 333, and the transmission low-pass filter and frequency converting unit 321. Consequently, a multiplexed signal of the two signals and a part of the signal B are generated while the signal C is restored. The signal A and the signal B finally pass the transmission low-pass filter and frequency converting unit 324 and the adder 337 while being restored stepwise in the same manner, whereby the output signal spectrum shown in FIG. 12(e) is generated. Compared with FIG. 12(a), it is seen that the signal arrangement of the signals A, B, C, and D is rearranged from {A, B, C, D} to {D, C, B, A} in a packed state without an unused region.

Subsequently, the multiplexed-signal selecting and distributing unit 340 connects an output signal of the adder 337 input from a port a' to the input port (1) or (2) through the switch unit 501 for distribution to multiplexing unit.

To output the signal to the area #3, the signal-selection switch unit 504 connects the signal from the input port (1) or (2) to the output port (7) and outputs the signal to the frequency converting unit 507. When a signal from one area is relayed to one area, the frequency converting unit 507 outputs the signal without specifically performing conversion. The frequency converting unit 507 can carry out frequency conversion such as correction of a center frequency according to necessity.

As on the demultiplexing side, the series of connections of the switches is controlled by a control signal input from the filter-bank control unit 13. The multiplexed-signal selecting and distributing unit 340 can output, based on the control signal from the filter-bank control unit 13, the signal from the port a' to the D/A conversion unit 35-3 for the area #3.

Thereafter, the D/A conversion unit 35-3 subjects the multiplexed signal output from the multiplexed-signal selecting and distributing unit 340 to digital-analog conversion and outputs the multiplexed signal to the area #3. Because signals are not output to the other D/A conversion units 35-1, 35-2, and 35-4, a sampling is not essential. For saving of consumption power, a sampling clock for D/A can be stopped according to a clock control signal from the filter-bank control unit 13. Actually, the multiplexed signal is output via an analog up-converter that converts the multiplexed signal into a radio frequency.

According to the processing explained above, the relay apparatus including the digital demultiplexing apparatus and the digital multiplexing apparatus can relay the signals A, B, C, and D from the area #1 to the area #3 while rearranging the signals in a frequency direction.

An operation for relaying signals from a plurality of areas to a plurality of areas is explained. Specifically, in the following explanation, the signal A of the area #1 is relayed to the area #4, the signal B of the area #2 is also relayed to the area #4, the signal C of the area #3 is relayed to the area #1, and the signal D of the area #4 is relayed to the area #3.

Figure 15:
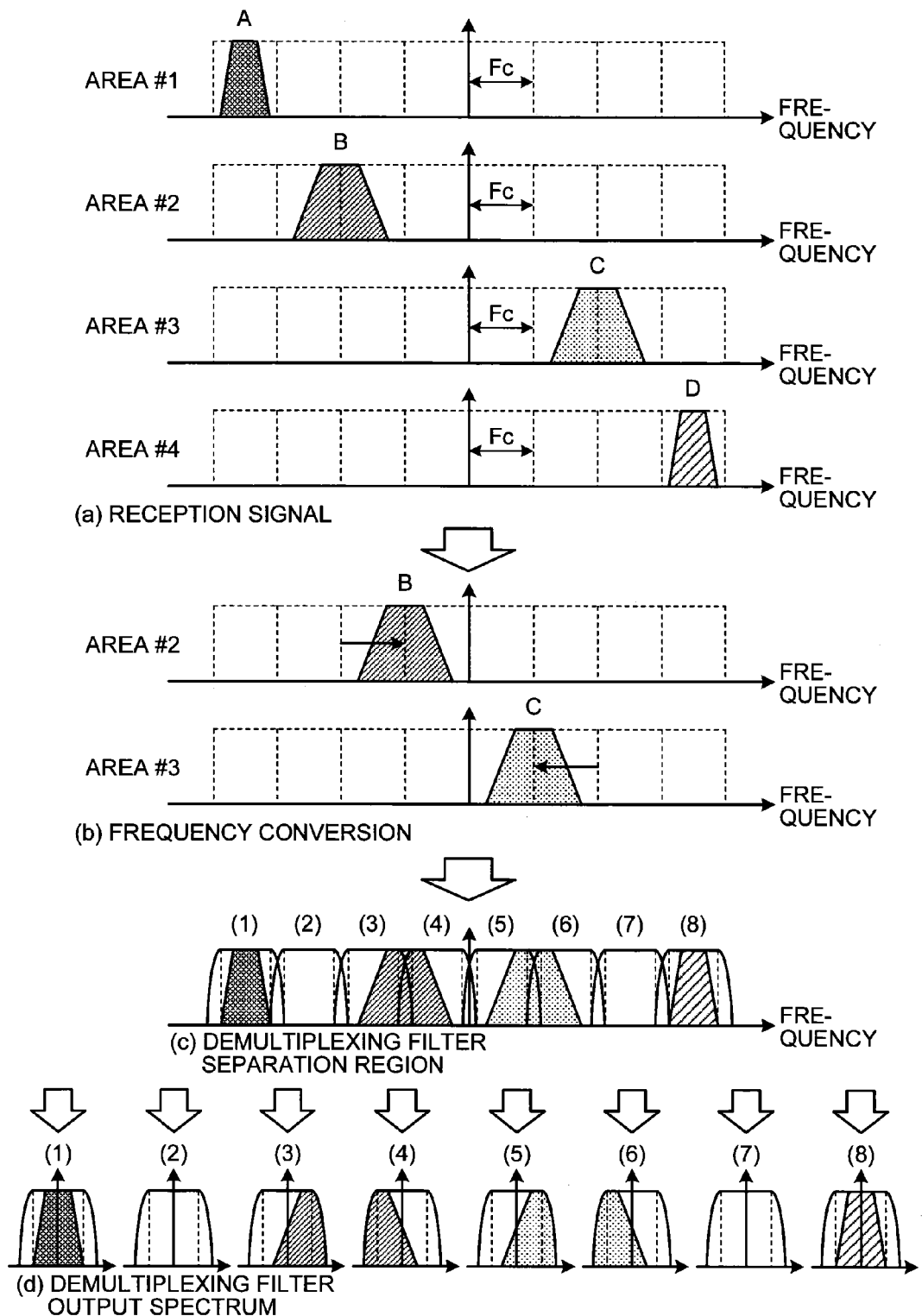
FIG. 15 is a diagram for explaining demultiplexing processing during relay among a plurality of areas.

First, the demultiplexing processing is explained. FIG. 15 is a diagram for explaining the demultiplexing processing during relay among a plurality of areas. In FIG. 15(a), signal spectra received from the areas #1 to #4 are shown. The signal A is input from the area #1, the signal B is input from the area #2, the signal C is input from the area #3, and the signal D is input from the area #4. The signals from all the areas occupy bands (Fc to 2 Fc) in a part of the system band (8 Fc). Such arrival of a plurality of signals in a part of the system band occurs when the areas are close to one another. In other words, frequencies used in the areas are divided and used to avoid interference of the same frequency among the areas. FIG. 15(a) is an example. Occupied frequency bands of the areas change according to traffic fluctuation in each of the areas. To avoid the interference of the same frequency, a total of bandwidths used in the areas is set substantially the same as the system band.

In the conventional digital demultiplexing apparatus, even if a signal band to be received is a part of the system band, a demultiplexing circuit is provided in each of the areas in order to cope with the traffic fluctuation. Therefore, when the number of areas increases, the demultiplexing circuits also increase according to the increase in the number of areas, thereby leading to an increase in a circuit size. On the other hand, in the digital demultiplexing apparatus in this embodiment, one apparatus can cope with four areas. Therefore, it is possible to reduce the circuit size to about a quarter.

First, the digital demultiplexing apparatus inputs the signal A from the area #1, which is sampled by the A/D conversion unit 11-1, to the ½ thinning-out filter unit 406 through the signal-selection switch unit 405 without converting a center frequency in the frequency converting unit 401 and reduces a sampling rate from 16 Fc to 8 Fc. As the ½ thinning-out filter unit 406, a half-band filter with a small circuit size can be used. Thereafter, the digital demultiplexing apparatus inputs the signal A to the frequency converting and reception low-pass filter unit 106 via the switch unit 408 for distribution to demultiplexing unit and the selector unit 136. According to the processing, the digital demultiplexing apparatus can realize the demultiplexing of the signal A of the area #1 using the frequency converting and reception low-pass filter units 106 and 114 and the reception-channel filter unit 128.

Similarly, the digital demultiplexing apparatus inputs the signal D from the area #4, which is sampled by the A/D conversion unit 11-4, to the ½ thinning-out filter unit 407 through the signal-selection switch unit 405 without converting a center frequency in the frequency converting unit 404 and reduces a sampling rate from 16 Fc to 8 Fc. Like the ½ thinning-out filter unit 406, as the ½ thinning-out filter unit 407, a half-band filter with a small circuit size can be used. Thereafter, the digital demultiplexing apparatus inputs the signal D to the frequency converting and reception low-pass filter unit 103 via the switch unit 408 for distribution to demultiplexing unit and the selector unit 133. According to the processing, the digital demultiplexing apparatus can realize the demultiplexing of the signal D of the area #4 using the frequency converting and reception low-pass filter units 103 and 107 and the reception-channel filter unit 121.

The digital demultiplexing apparatus inputs the signal B from the area #2 sampled by the A/D conversion unit 11-2 to the frequency converting and reception low-pass filter unit 102 through the signal-selection switch unit 405, the switch unit 408 for distribution to demultiplexing unit, and the selector unit 132 after converting a center frequency into −1.0 Fc in the frequency converting unit 402 (FIG. 15(b)). According to the processing, the digital demultiplexing apparatus can realize the demultiplexing of the signal B of the area #2 using the frequency converting and reception low-pass filter units 102, 105, 111, and 112 and the reception-channel filter units 125 and 126.

Similarly, the digital demultiplexing apparatus inputs the signal C from the area #3 sampled by the A/D conversion unit 11-3 to the frequency converting and reception low-pass filter unit 101 through the signal-selection switch unit 405, the switch unit 408 for distribution to demultiplexing unit, and the selector unit 131 after converting a center frequency into +1.0 Fc in the frequency converting unit 403 (FIG. 15(b)). According to the processing, the digital demultiplexing apparatus can realize the demultiplexing of the signal C of the area #3 using the frequency converting and reception low-pass filter units 101, 104, 109, and 110 and the reception-channel filter units 123 and 124.

The series of switching of the switches is controlled by a control signal input from the filter-bank control unit 13. The filter-bank control unit 13 generates the control signal based on reception channel information estimated from the signals received from the areas #1 to #4.

As it is evident from the processing, the frequency converting units 401 to 404 are functions necessary for correcting spectrum positions of a reception signal so that the demultiplexing processing for the signal can be realized from halfway in the tree that forms the demultiplexing. The ½ thinning-out filter units 406 and 407 are functions necessary for aligning (reducing) a sampling rate so that the signal can be connected from halfway in the tree that forms the demultiplexing.

When the signals from the areas are a part of the system band, the digital demultiplexing apparatus alone can collectively demultiplex the signals A, B, C, and D from the areas by carrying out the processing explained above. Signals after the demultiplexing by the processing are shown in FIGS. 15(c) and 15(d).

Figure 16:
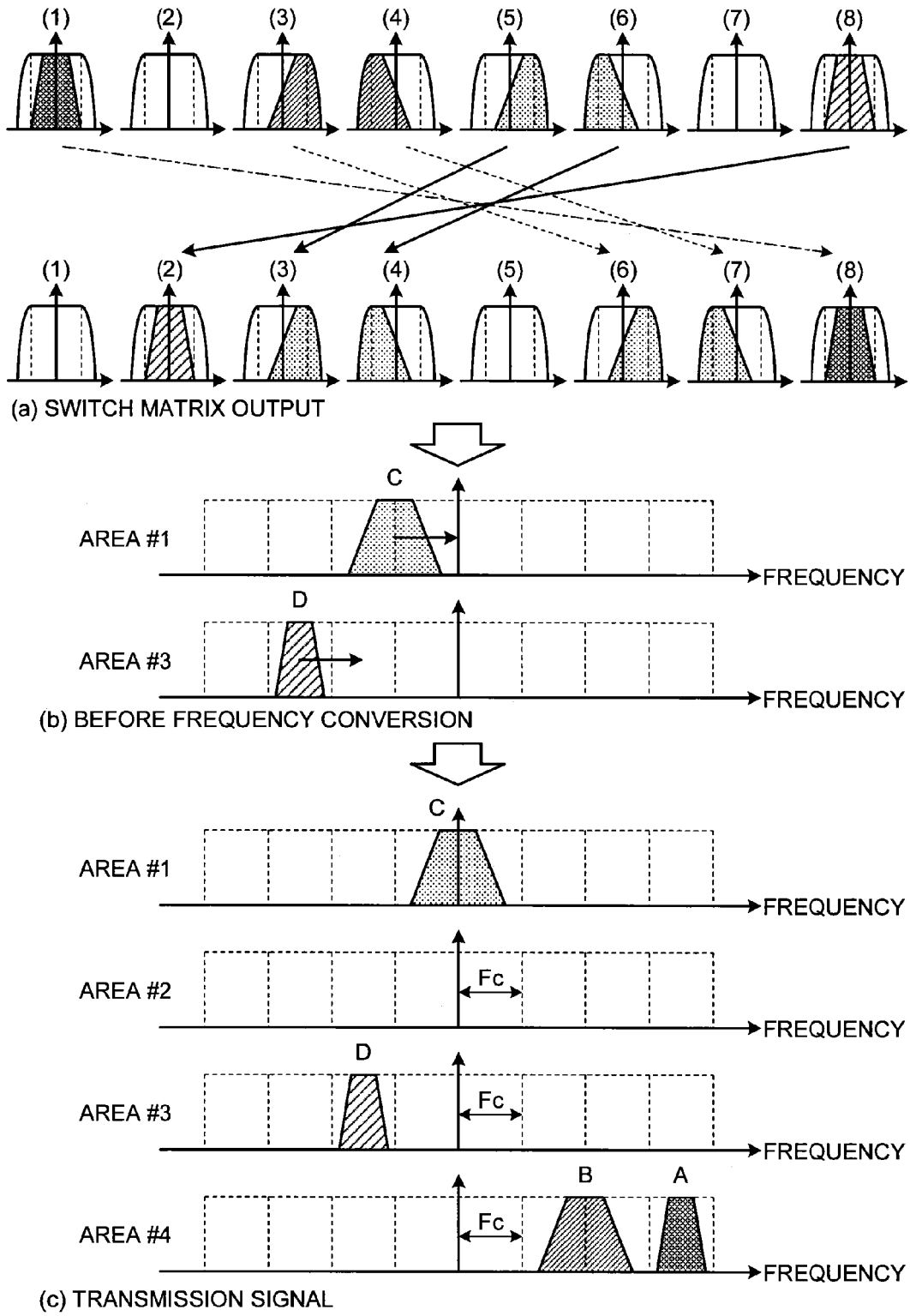
FIG. 16 is a diagram for explaining multiplexing processing during relay among a plurality of areas.

The multiplexing processing is explained. FIG. 16 is a diagram for explaining the multiplexing processing during relay among a plurality of areas. The non-reproducing-system switch matrix unit 15 switches signals after the demultiplexing as shown in FIG. 16(a). Thereafter, the multiplexing processing is applied to the signals after the switching by the transmission low-pass filter and frequency converting units 311 to 324 and the adders 331 and 337 stepwisely according to the operation shown in FIG. 10. The operation is different from the transmission operation to one area in that the signals in the process of the multiplexing are extracted according to necessity and transmitted to the areas via the processing by the multiplexed-signal selecting and distributing unit 340.

Specifically, in the conventional digital multiplexing apparatus, a signal band to be transmitted is a part of the system band and the multiplexing circuits are provided for the respective areas. Therefore, when the number of areas increases, the multiplexing circuits also increases according to the increase in the number of areas, thereby leading to an increase in a circuit size. On the other hand, in the digital multiplexing apparatus in this embodiment, one apparatus can cope with four areas. Therefore, it is possible to reduce the circuit size to about a quarter.

First, the digital multiplexing apparatus inputs the switched signal D to the multiplexed-signal selecting and distributing unit 340 through the transmission low-pass filter and frequency converting unit 317, the adder 334, and the transmission low-pass filter and frequency converting unit 322. Although not shown in FIG. 7, the signal D is subjected to connection control to be not input to the adder 336. For example, the transmission low-pass filter and frequency converting unit can switch an output destination based on the control by the filter-bank control unit 13. The digital multiplexing apparatus can include a selector unit. The selector unit can switch the output destination based on the control by the filter-bank control unit 13. However, the switching of the output destination is not limited to this.

Thereafter, the multiplexed-signal selecting and distributing unit 340 inputs the signal D to the double-interpolation filter unit 502 (or 503) through the switch unit 501 for distribution to multiplexing unit and increases a sampling rate from 8 Fc to 16 Fc. A spectrum of the signal D after double interpolation (before frequency conversion) is shown in FIG. 16(b). The double-interpolation filter unit 502 (or 503) inputs the signal D after the double interpolation to the frequency converting unit 507 through the signal-selection switch unit 504. The frequency converting unit 507 outputs the signal D as a signal of the area #3 shown in FIG. 16(c) after subjecting the signal D to frequency conversion in a direction of an arrow (→) shown in FIG. 16(b).

Similarly, the digital multiplexing apparatus inputs the switched signal C to the multiplexed-signal selecting and distributing unit 340 through the transmission low-pass filter and frequency converting unit 321, the adder 336, and the transmission low-pass filter and frequency converting unit 324 after restoring the signal in the transmission low-pass filter and frequency converting units 315 and 316 and the adder 333. As explained above, although not shown in FIG. 7, the signal C is subjected to connection control to be not input to the adder 337. The transmission low-pass filter and frequency converting units or a not-shown selector unit can switch an output destination based on the control by the filter-bank control unit 13. However, the switching of the output destination is not limited to this.

Thereafter, the multiplexed-signal selecting and distributing unit 340 inputs the signal C to the frequency converting unit 505 through the switch unit 501 for distribution to multiplexing unit and the signal-selection switch unit 504. A spectrum of the signal C (before frequency conversion) is shown in FIG. 16(b). The frequency converting unit 505 outputs the signal C as a signal of the area #1 shown in FIG. 16(c) after subjecting the signal C to frequency conversion in the direction of the arrow (→) shown in FIG. 16(b).

On the other hand, the digital multiplexing apparatus collectively treats the switched signals A and B because both the signals A and B are transmitted to the same area (#4). First, the digital multiplexing apparatus combines parts of the signal A and the signal B in the transmission low-pass filter and frequency converting units 311 and 312 and the adder 331. Further, the digital multiplexing apparatus performs combination of a signal from another path (the transmission low-pass filter and frequency converting unit 313→the adder 332→the transmission low-pass filter and frequency converting unit 320) and the signal combined earlier and generates a signal A+B. The digital multiplexing apparatus inputs the signal A+B to the multiplexed-signal selecting and distributing unit 340 through the transmission low-pass filter and frequency converting unit 323. As explained above, although not shown in FIG. 7, the signal A+B is subjected to connection control to be not input to the adder 337. The transmission low-pass filter and frequency converting units or a not-shown selector unit can switch an output destination based on the control by the filter-bank control unit 13. However, the switching of the output destination is not limited to this.

Thereafter, the multiplexed-signal selecting and distributing unit 340 inputs the signal A+B to the frequency converting unit 508 through the switch unit 501 for distribution to multiplexing unit and the signal-selection switch unit 504. In this case, a frequency position of the signal A+B before the input to the frequency converting unit 508 has a relation in which the frequency position coincides with an original frequency position for transmission to the area #4. Therefore, the frequency converting unit 508 outputs the signal A+B as a signal of the area #4 without subjecting the signal A+B to frequency conversion (FIG. 16(c)).

As it is evident from the processing explained above, the frequency converting units 505 to 508 are functions for performing, when a spectrum position of a signal generated in the multiplexing process is different from a spectrum position to which the signal is originally desired to be transmitted, frequency conversion to realize transmission to the spectrum position to which the signal is originally desired to be transmitted. The double-interpolation filter units 502 and 503 are functions necessary for extracting a signal halfway in the tree that forms the multiplexing and aligning (increasing) a sampling rate when subjecting the signal to D/A conversion.

When the transmission signals to the areas are a part of the system band, the digital multiplexing apparatus alone can collectively multiplex and transmit the transmission signals A, B, C, and D to the areas by carrying out the processing explained above.

As explained above, the digital demultiplexing apparatus and the digital multiplexing apparatus in this embodiment can freely cope with, through the control of the switches, the relays between a plurality of areas and a plurality of areas besides the relay between one area and one area. When signal bands used in the areas are a part of the system band, one digital demultiplexing apparatus and one digital multiplexing apparatus can cope with a plurality of areas. Therefore, it is possible to reduce a circuit size.

In the above explanation, the connection destinations of the demultiplexed-signal selecting and distributing unit 130 and the multiplexed-signal selecting and distributing unit 340 are respectively the frequency converting and reception low-pass filter units and the transmission low-pass filter and frequency converting units at the stages 1 and 2. However, the connection destinations are not limited to this. A range of the connection destinations can be expanded to the stage 3. In this case, in the demultiplexed-signal selecting and distributing unit 130, it is necessary to add, besides the ½ thinning-out filter units 406 and 407, a plurality of ¼ thinning-out filter units between the signal-selection switch unit 405 and the switch unit 408 for distribution to demultiplexing unit. Similarly, in the multiplexed-signal selecting and distributing unit 340, it is necessary to add, besides the double-interpolation filter units 502 and 503, a plurality of quadruple-interpolation filter units between the switch unit 501 for distribution to multiplexing unit and the signal-selection switch unit 504.

When the ¼ thinning-out filter units are used, a signal is further down-sampled than the down-sampling performed by using the ½ thinning-out filter units. When the quadruple-interpolation filter units are used, a signal is further up-sampled than the up-sampling performed using the double-interpolation filter units. In other words, in the demultiplexed-signal selecting and distributing unit 130, the level of the sampling is changed according to an arrangement position of the frequency converting and reception low-pass filter unit as an output destination of a signal. In the multiplexed-signal selecting and distributing unit 340, the level of the sampling is changed according to an arrangement position of the transmission low-pass filter and frequency converting unit as an input source of a signal.

When the range of the connection destinations is expanded to the stage 3 as explained above, the circuit size of the demultiplexed-signal selecting and distributing unit 130 and the multiplexed-signal selecting and distributing unit 340 slightly increases. However, there is an effect that it is possible to further increase the number of areas and conditions that one digital demultiplexing apparatus and one digital multiplexing apparatus can cope with.

For example, when the bandwidth (2 Fc) of the signal B from the area #2 in FIG. 15(a) is expanded to 3 Fc (the center frequency is −1.5 Fc), in the digital demultiplexing apparatus shown in FIG. 1, the frequency converting and reception low-pass filter unit 106 that processes the signal A from the area #1 is used for the processing for demultiplexing the signal B from the area #2. Therefore, the digital demultiplexing apparatus cannot cope with the signal A from the area #1.

On the other hand, in the digital demultiplexing apparatus in which the range of the connection destinations is expanded to the stage 3, the signal A from the area #1 can be directly connected to the frequency converting and reception low-pass filter unit 114 without the frequency converting and reception low-pass filter unit 106. Therefore, even when the bandwidth (2 Fc) of the signal B is expanded to 3 Fc, it is possible to simultaneously process the signal A from the area #1.

The same effect can be realized by adding an auxiliary tree configuration to a basic circuit. For example, in the digital demultiplexing apparatus, the digital demultiplexing unit 12 includes, as an auxiliary tree, one more tree including the selector unit 133, the frequency converting and reception low-pass filter units 103, 107, and 108, and the reception-channel filter units 121 and 122. The digital demultiplexing unit 12 performs processing for coping with normal demultiplexing using the basic circuit (see FIG. 1) and, when demultiplexing that the basic circuit cannot cope with occurs, inputting a signal to the auxiliary tree configuration from the demultiplexed-signal selecting and distributing unit 130. Whether the auxiliary tree configuration is used is controlled by a control signal as at the normal time.

Similarly, in the digital multiplexing apparatus, the digital multiplexing unit 34 includes, as an auxiliary tree, one more tree including the transmission-channel filter units 301 and 302, the transmission low-pass filter and frequency converting units 311 and 312, the adder 331, and the transmission low-pass filter and frequency converting unit 319. The digital multiplexing unit 34 performs processing for coping with normal multiplexing using the basic circuit (see FIG. 7) and, when multiplexing that the basic circuit cannot cope with occurs, inputting a multiplexed signal using the auxiliary tree configuration. Whether the auxiliary tree configuration is used is controlled by a control signal as at the normal time.

The configuration in which the number of areas is four and Stage=3 is explained. However, the number of areas and the number of stages are not limited to these values. The number of areas and the number of stages can be set according to required values for a relay system.

The operation for relaying the signal after the demultiplexing without demodulating the signal is explained above. However, the present invention is also applicable in the case of reproducing relay system for demodulating and relaying the signal. For example, it is possible to easily realize demodulation and decoding for a plurality of different band signals simply by selecting a signal for reproduction and relay out of signals in the demultiplexing process in the selector unit 16 and carrying out the demodulation and decoding processing in the demodulating and decoding unit 17 as shown in FIG. 1. When demodulated and decoded data at a plurality of rates subjected to path setting are modulated again in the reproducing-system switch matrix unit 18, as shown in FIG. 7, it is possible to easily realize multiplexing for a plurality of different band signals simply by allocating, in the selector unit 32, signals encoded and modulated by the encoding and modulating unit 31 to the inputs of the transmission low-pass filter and frequency converting units of the stages. According to the series of processing, it is also possible to easily realize reproducing relay system for a plurality of different band signals.

As explained above, in this embodiment, the digital demultiplexing apparatus includes, in the basic circuit including one tree, the demultiplexed-signal selecting and distributing unit capable of receiving signals from a plurality of areas and distributing the signals to stages configured halfway in the tree. The demultiplexed-signal selecting and distributing unit distributes a plurality of signals to the stages configured halfway in the tree. Therefore, it is possible to simultaneously demultiplex signals from the areas. Consequently, it is possible to simultaneously demultiplex the signals from the areas while reducing a circuit size and the numbers of kinds of arithmetic processing.

The digital multiplexing apparatus includes, in the basic circuit including one tree, the multiplexed-signal selecting and distributing unit capable of receiving signals from stages configured halfway in the tree and outputting the signals to a plurality of areas. The multiplexed-signal selecting and distributing unit receives a plurality of signals from the stages configured halfway in the tree. Therefore, it is possible to simultaneously multiplex and transmit signals from the areas. Consequently, it is possible to simultaneously demultiplex the signals from the areas while reducing a circuit size and the numbers of kinds of arithmetic processing.

In the above explanation, as the specific example, the digital demultiplexing apparatus and the digital multiplexing apparatus are mounted on the relay apparatus. However, the present invention is not limited to this. For example, the present invention is also applicable to a radio communication apparatus mounted with the digital demultiplexing apparatus and the digital multiplexing apparatus or one of the digital demultiplexing apparatus and the digital multiplexing apparatus. Further, the present invention is also applicable to a radio communication system including a plurality of radio communication apparatuses mounted with the two apparatuses or a radio communication system including a radio communication apparatus mounted with the digital demultiplexing apparatus and a radio communication apparatus mounted with the digital multiplexing apparatus.

As explained above, the demultiplexing apparatus according to the present invention is useful as an apparatus that demultiplexes a signal of radio communication and, in particular, suitable when signals from a plurality of areas are simultaneously demultiplexed.

REFERENCE SIGNS LIST 11-1 to 11-4 A/D conversion units
12 digital demultiplexing unit
13 filter-bank control unit
14 reception-clock supplying unit
15 non-reproducing-system switch matrix unit
16 selector unit
17 demodulating and decoding unit
18 reproducing-system switch matrix unit
21 frequency converting unit
22 low-pass filter unit
23 low-pass filter unit
24 down-sampler unit
25 up-sampler unit
31 encoding and modulating unit
32 selector unit
33 transmission-clock supplying unit
34 digital multiplexing unit
35-1 to 35-4 D/A conversion units 101 to 114 frequency converting and reception low-pass filter units
121 to 128 reception-channel filter units
130 demultiplexed-signal selecting and distributing unit
131 to 136 selector units
211 local-signal generating unit
212 complex multiplication unit
221 to 239 register units
240 to 250 multipliers
251 real-number adding unit
252 shift register unit
301 to 308 transmission-channel filter units
311 to 324 transmission low-pass filter and frequency converting units
331 to 337 adders
340 multiplexed-signal selecting and distributing unit
401 to 404 frequency converting units
405 signal-selection switch unit
406, 407 ½ thinning-out filter units
408 switch unit for distribution to demultiplexing unit
501 switch unit for distribution to multiplexing unit
502, 503 double-interpolation filter units
504 signal-selection switch unit
505 to 508 frequency converting units

The invention claimed is:

1. A demultiplexing apparatus comprising:
a demultiplexed-signal selecting and distributing unit configured to output one or more input signals to one or more output destinations designated by a predetermined control signal;
a reception low-pass filter group including,
frequency converting and reception low-pass filter units configured to apply frequency conversion processing and down-sampling processing to an output signal of the demultiplexed-signal selecting and distributing unit,
the frequency converting and reception low-pass filter units being arranged in a tree shape, and
at least a part of the frequency converting and reception low-pass filter units dividing the output signal into two and inputting the divided output signals to two frequency converting and reception low-pass filter units at a next stage; and
a selector unit configured to switch, based on the control signal, an input source of a signal input to one of the frequency conversion and reception low-pass filter units between 1) the demultiplexed-signal selecting and distributing unit and 2) a preceding frequency converting and reception low-pass filter unit at a preceding stage of the frequency converting and reception low-pass filter units.

2. The demultiplexing apparatus according to claim 1, wherein the demultiplexed-signal selecting and distributing unit changes a conversion amount of a frequency in the frequency conversion processing and a level of down-sampling in the down-sampling processing based on an arrangement position of the frequency converting and reception low-pass filter unit set as an output destination and a bandwidth of a signal.

3. The demultiplexing apparatus according to claim 1, further comprising a non-reproducing-system switch matrix unit configured to receive, as inputs, signals output from the frequency converting and reception low-pass filter units, select a part or all of the input signals based on a path setting signal generated based on channel information estimated from the input signals, and perform rearrangement of frequency directions of the selected input signals.

4. The demultiplexing apparatus according to claim 1, further comprising:
a reproduction and relay signal selector unit configured to select a signal for reproduction and relay from the input signals or the output signals from the frequency converting and reception low-pass filter units;
a demodulating and decoding unit configured to perform demodulation and decoding of the signal for reproduction and relay; and
a reproducing-system switch matrix unit configured to output the signal after the demodulation and the decoding based on a set path.

5. The demultiplexing apparatus according to claim 1, wherein the frequency converting and reception low-pass filter units are half-band filters.

6. The demultiplexing apparatus according to claim 1, wherein the frequency converting and reception low-pass filter units included in the reception low-pass filter group output the output signals while reducing a sampling rate to a half of a data rate of the input signals through the down-sampling processing.

7. The demultiplexing apparatus according to claim 1, further comprising a reception-channel filter unit configured to subject the signals from the frequency converting and reception low-pass filter units to waveform shaping with a desired frequency characteristic and output the signals.

8. A multiplexing apparatus comprising:
a transmission low-pass filter group including,
transmission low-pass filter and frequency converting units configured to apply up-sampling processing and frequency conversion processing to input signals and output the input signals,
the transmission low-pass filter and frequency converting units being arranged in a tournament shape with adders at every tournament node, and
at least a part of the transmission low-pass filter and frequency converting units inputting, to the transmission low-pass filter and frequency converting units at a next stage, a signal obtained by combining, for each pair of adjacent bands, two output signals and subjecting the output signals for every pair of the adjacent bands to addition processing;
an adding unit configured to subject signals output from a pair of the transmission low-pass filter and frequency converting units, bands of which are adjacent to each other, to addition processing; and
a multiplexed-signal selecting and distributing unit configured to output, to one or more output destinations designated by a predetermined control signal, signals output from the transmission low-pass filter and frequency converting units.

9. The multiplexing apparatus according to claim 8, wherein the multiplexed-signal selecting and distributing unit changes a level of up-sampling in the up-sampling processing and a conversion amount of a frequency in the frequency conversion processing based on an arrangement position of the transmission low-pass filter and frequency converting unit that outputs an input signal in the tournament shape of the N-stage and a bandwidth of the signal.

10. The multiplexing apparatus according to claim 8, further comprising a non-reproducing-system switch matrix unit configured to select a part or all of the input signals based on a path setting signal generated based on channel information estimated from the input signals, perform rearrangement of frequency directions of the selected input signals, and output the rearranged input signals to a transmission channel filter unit.

11. The multiplexing apparatus according to claim 8, further comprising:
- a reproducing-system switch matrix unit configured to output a signal after demodulation and decoding based on a set path;
- an encoding and modulating unit configured to perform encoding and modulation of the signal output from the reproducing-system switch matrix unit; and
- a selector unit configured to allocate the encoded and modulated signal to an input stage of a transmission-channel filter unit or an output stage of the adding unit.

12. The multiplexing apparatus according to claim 8, wherein the transmission low-pass filter and frequency converting units are half-band filters.

13. The multiplexing apparatus according to claim 8, wherein the transmission low-pass filter and frequency converting units included in the transmission low-pass filter group output the output signals while interpolating a sampling rate to a double of a data rate of the input signals through the up-sampling processing.

14. The multiplexing apparatus according to claim 8, wherein a transmission-channel filter unit is configured to subject the input signals to waveform shaping with a predetermined frequency characteristic and outputs the input signals to the transmission low-pass filter and frequency converting units.

15. A relay apparatus comprising:
the multiplexing apparatus according to claim 10; and
a demultiplexing apparatus including:
- a demultiplexed-signal selecting and distributing unit configured to output one or more input signals to one or more output destinations designated by a predetermined control signal;
- a reception low-pass filter group including,
  - frequency converting and reception low-pass filter units configured to apply frequency conversion processing and down-sampling processing to an output signal of the demultiplexed-signal selecting and distributing unit,
  - the frequency converting and reception low-pass filter units being arranged in a tree shape, and
  - at least a part of the frequency converting and reception low-pass filter units dividing the output signal into two and inputting the divided output signals to two frequency converting and reception low-pass filter units at a next stage;
- a selector unit configured to switch, based on the control signal, an input source of a signal input to one of the frequency conversion and reception low-pass filter units between 1) the demultiplexed-signal selecting and distributing unit and 2) a preceding frequency converting and reception low-pass filter unit at a preceding stage of the frequency converting and reception low-pass filter units; and
- a non-reproducing-system switch matrix unit configured to receive, as inputs, signals output from the frequency converting and reception low-pass filter units, select a part or all of the input signals based on a path setting signal generated based on channel information estimated from the input signals, and perform rearrangement of frequency directions of the selected input signals.

16. The relay apparatus according to claim 15, wherein one or both of the frequency converting and reception low-pass filter units included in the demultiplexing apparatus and the transmission low-pass filter and frequency converting units included in the multiplexing apparatus are half-band filters.

17. A relay apparatus comprising:
the multiplexing apparatus according to claim 11; and
a demultiplexing apparatus including:
- a demultiplexed-signal selecting and distributing unit configured to output one or more input signals to one or more output destinations designated by a predetermined control signal;
- a reception low-pass filter group including,
  - frequency converting and reception low-pass filter units configured to apply frequency conversion processing and down-sampling processing to an output signal of the demultiplexed-signal selecting and distributing unit,
  - the frequency converting and reception low-pass filter units being arranged in a tree shape, and
  - at least a part of the frequency converting and reception low-pass filter units dividing the output signal into two and inputting the divided output signals to two frequency converting and reception low-pass filter units at a next stage;
- a selector unit configured to switch, based on the control signal, an input source of a signal input to one of the frequency conversion and reception low-pass filter units between 1) the demultiplexed-signal selecting and distributing unit and 2) a preceding frequency converting and reception low-pass filter unit at a preceding stage of the frequency converting and reception low-pass filter units; and
- a reproduction and relay signal selector unit configured to select a signal for reproduction and relay from the input signals or the output signals from the frequency converting and reception low-pass filter units;
- a demodulating and decoding unit configured to perform demodulation and decoding of the signal for reproduction and relay; and
- a reproducing-system switch matrix unit configured to output the signal after the demodulation and the decoding based on a set path.

18. The relay apparatus according to claim 17, wherein one or both of the frequency converting and reception low-pass filter units included in the demultiplexing apparatus and the transmission low-pass filter and frequency converting units included in the multiplexing apparatus are half-band filters.

19. A relay apparatus comprising:
the multiplexing apparatus according to claim 14; and
a demultiplexing apparatus including:
- a demultiplexed-signal selecting and distributing unit configured to output one or more input signals to one or more output destinations designated by a predetermined control signal;
- a reception low-pass filter group including,
  - frequency converting and reception low-pass filter units configured to apply frequency conversion processing and down-sampling processing to an output signal of the demultiplexed-signal selecting and distributing unit,
  - the frequency converting and reception low-pass filter units being arranged in a tree shape, and
  - at least a part of the frequency converting and reception low-pass filter units dividing the output signal into two and inputting the divided output signals to two frequency converting and reception low-pass filter units at a next stage; and
- a selector unit configured to switch, based on the control signal, an input source of a signal input to one of the frequency conversion and reception low-pass filter units between 1) the demultiplexed-signal selecting and distributing unit and 2) a preceding frequency converting and reception low-pass filter unit at a preceding stage of the frequency converting and reception low-pass filter units.

20. A relay apparatus comprising:
the multiplexing apparatus according to claim 8; and
a demultiplexing apparatus including:
   a demultiplexed-signal selecting and distributing unit configured to output one or more input signals to one or more output destinations designated by a predetermined control signal;
   a reception low-pass filter group including,
      frequency converting and reception low-pass filter units configured to apply frequency conversion processing and down-sampling processing to an output signal of the demultiplexed-signal selecting and distributing unit,
      the frequency converting and reception low-pass filter units being arranged in a tree shape, and
      at least a part of the frequency converting and reception low-pass filter units dividing the output signal into two and inputting the divided output signals to two frequency converting and reception low-pass filter units at a next stage;
   a selector unit configured to switch, based on the control signal, an input source of a signal input to one of the frequency conversion and reception low-pass filter units between 1) the demultiplexed-signal selecting and distributing unit and 2) a preceding frequency converting and reception low-pass filter unit at a preceding stage of the frequency converting and reception low-pass filter units; and
   a reception-channel filter unit configured to subject the signals from the frequency converting and reception low-pass filter units to waveform shaping with a desired frequency characteristic and output the signals.

* * * * *